GitHub

(12) United States Patent
Yang et al.

(10) Patent No.: US 11,265,114 B2
(45) Date of Patent: Mar. 1, 2022

(54) COMMUNICATION RESOURCE PAIRING AND REPETITION

(71) Applicant: QUALCOMM Incorporated, San Diego, CA (US)

(72) Inventors: Wei Yang, San Diego, CA (US); Seyedkianoush Hosseini, San Diego, CA (US); Jing Jiang, San Diego, CA (US); Wanshi Chen, San Diego, CA (US); Chih-Ping Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/523,896

(22) Filed: Jul. 26, 2019

(65) Prior Publication Data

US 2020/0044784 A1    Feb. 6, 2020

Related U.S. Application Data

(60) Provisional application No. 62/713,459, filed on Aug. 1, 2018.

(51) Int. Cl.
*H04L 1/18* (2006.01)
*H04W 24/08* (2009.01)
(Continued)

(52) U.S. Cl.
CPC .......... *H04L 1/1819* (2013.01); *H04L 1/0004* (2013.01); *H04L 1/1845* (2013.01);
(Continued)

(58) Field of Classification Search
CPC ... H04L 1/1819; H04L 5/0082; H04L 1/1845; H04L 1/0004; H04L 5/0007;
(Continued)

(56) References Cited

U.S. PATENT DOCUMENTS 10,524,248 B2 * 12/2019 Yeo ................. H04W 72/042
2016/0174216 A1 * 6/2016 Jain ................. H04L 1/1812
370/336

(Continued)

FOREIGN PATENT DOCUMENTS

EP       1672818 A1     6/2006
WO   WO-2010088536 A1  8/2010

OTHER PUBLICATIONS

International Search Report and Written Opinion—PCT/US2019/043973—ISA/EPO—dated Oct. 25, 2019.

*Primary Examiner* — Harry H Kim
(74) *Attorney, Agent, or Firm* — Holland & Hart LLP

(57) ABSTRACT

Methods, systems, and devices for increasing the reliability of low latency transmissions are described. For example, multiple control messages and/or multiple data messages may be transmitted for a single transport block. Explicit and/or implicit signaling may be used to support the repetition of control and data transmissions in a low latency environment. For example, explicit signaling may be used to indicate a correspondence between repeated control and/or data messages. Additionally or alternatively, particular configurations may be used to implicitly signal a correspondence between repeated control and/or data messages.

62 Claims, 19 Drawing Sheets

(51) Int. Cl.
  *H04L 5/00* (2006.01)
  *H04L 1/00* (2006.01)
  *H04W 72/04* (2009.01)

(52) U.S. Cl.
  CPC ........... *H04L 5/0082* (2013.01); *H04W 24/08* (2013.01); *H04W 72/0453* (2013.01)

(58) Field of Classification Search
  CPC ....... H04L 5/0094; H04L 5/0053; H04L 1/18; H04W 24/08; H04W 72/0453; H04W 48/12
  See application file for complete search history.

(56) References Cited

U.S. PATENT DOCUMENTS

| | | |
|---|---|---|
| 2017/0048886 A1 | 2/2017 | Sun et al. |
| 2018/0279344 A1* | 9/2018 | Bagheri ............... H04W 72/044 |
| 2019/0182756 A1* | 6/2019 | Wang .................... H04W 48/12 |
| 2019/0239214 A1* | 8/2019 | Yang ..................... H04L 1/1887 |
| 2019/0349912 A1* | 11/2019 | Zhang ................... H04L 5/0053 |
| 2020/0059821 A1* | 2/2020 | Wirth .................... H04L 1/1851 |
| 2020/0059904 A1* | 2/2020 | Takeda ................ H04W 72/042 |
| 2020/0128542 A1* | 4/2020 | Tang .................... H04W 72/042 |
| 2020/0213035 A1* | 7/2020 | Wang .................... H04W 76/27 |
| 2020/0229216 A1* | 7/2020 | Zhu .................. H04W 72/0453 |
| 2020/0275438 A1* | 8/2020 | Jung ................. H04W 72/1273 |

* cited by examiner

COMMUNICATION RESOURCE PAIRING AND REPETITION

CROSS REFERENCE

The present application for Patent claims the benefit of U.S. Provisional Patent Application No. 62/713,459 by YANG et al., entitled "COMMUNICATION RESOURCE PAIRING AND REPETITION," filed Aug. 1, 2018, assigned to the assignee hereof, and expressly incorporated by reference herein.

BACKGROUND

The following relates generally to wireless communications, and more specifically to communication resource pairing and repetition.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), orthogonal frequency divisional multiplexing (OFDM), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A wireless communication may support ultra-reliable low latency communication. (URLLC). For URLLCs, data transmissions must be completed with low error rates and within short periods of time. Techniques for increase the reliability of low latency transmissions may be limited because of the strict timing requirements for low latency transmissions.

SUMMARY

The described techniques relate to improved methods, systems, devices, and apparatuses that support communication resource pairing and repetition. Generally, the described techniques provide for methods, systems, devices, and apparatuses for increasing the reliability of low latency transmissions by transmitting repetitions of control and data information. For example, multiple control messages and/or multiple data messages may be transmitted for a single transport block. The described techniques also discuss methods, systems, devices, and apparatuses that support the repetition of control and data transmissions in a low latency environment. For example, explicit signaling may be used to indicate a correspondence between repeated control and/or data messages. Or particular configurations may be used to implicitly signal a correspondence between repeated control and/or data messages. For example, a correspondence between repeated control message may be determined when multiple control messages are determined as carrying the same control information.

A method of wireless communication at a wireless device is described. The method may include receiving a signal indicating a correspondence between a first control channel candidate resource and a second control channel candidate resource, monitoring the first control channel candidate resource and the second control channel candidate resource, decoding at least one of a first control message received over the first control channel candidate resource or a second control message received over the second control channel candidate resource based on the monitoring, where the first control message and the second control message indicate at least one data resource, and receiving a data message over the at least one data resource, where the data message conveys information for a single transport block.

An apparatus for wireless communication at a wireless device is described. The apparatus may include a processor, memory in electronic communication with the processor, and instructions stored in the memory. The instructions may be executable by the processor to cause the apparatus to receive a signal indicating a correspondence between a first control channel candidate resource and a second control channel candidate resource, monitor the first control channel candidate resource and the second control channel candidate resource, decode at least one of a first control message received over the first control channel candidate resource or a second control message received over the second control channel candidate resource based on the monitoring, where the first control message and the second control message indicate at least one data resource, and receive a data message over the at least one data resource, where the data message conveys information for a single transport block.

Another apparatus for wireless communication at a wireless device is described. The apparatus may include means for receiving a signal indicating a correspondence between a first control channel candidate resource and a second control channel candidate resource, monitoring the first control channel candidate resource and the second control channel candidate resource, decoding at least one of a first control message received over the first control channel candidate resource or a second control message received over the second control channel candidate resource based on the monitoring, where the first control message and the second control message indicate at least one data resource, and receiving a data message over the at least one data resource, where the data message conveys information for a single transport block.

A non-transitory computer-readable medium storing code for wireless communication at a wireless device is described. The code may include instructions executable by a processor to receive a signal indicating a correspondence between a first control channel candidate resource and a second control channel candidate resource, monitor the first control channel candidate resource and the second control channel candidate resource, decode at least one of a first control message received over the first control channel candidate resource or a second control message received over the second control channel candidate resource based on the monitoring, where the first control message and the second control message indicate at least one data resource, and receive a data message over the at least one data resource, where the data message conveys information for a single transport block.

In some examples of the method, apparatuses, and non-transitory computer-readable medium described herein, the monitoring may include operations, features, means, or instructions for receiving the first control message over the first control channel candidate resource in the first set of control channel resources and the second control message over the second control channel candidate resource in the second set of control channel resources.

In some examples of the method, apparatuses, and non-transitory computer-readable medium described herein, receiving the signal indicating the correspondence may include operations, features, means, or instructions for determining the correspondence between the first control channel candidate resource and the second control channel candidate resource based on the second signal.

In some examples of the method, apparatuses, and non-transitory computer-readable medium described herein, the first control channel candidate resource may be associated with a first index of the first set of control channel resources and the second control channel candidate resource may be associated with a second index of the second set of control channel resources, where a value of the first index and a value of the second index being the same, and where the signal indicates the value of the first index and the second index.

In some examples of the method, apparatuses, and non-transitory computer-readable medium described herein, the first set of control channel resources may be associated with a first time and a first frequency bandwidth and the second set of control channel resources may be associated with a second time and a second frequency bandwidth.

In some examples of the method, apparatuses, and non-transitory computer-readable medium described herein, the monitoring may include operations, features, means, or instructions for receiving the first control message and the second control message over the set of control channel resources.

In some examples of the method, apparatuses, and non-transitory computer-readable medium described herein, the first control message and the second control message indicate a first data resource.

Some examples of the method, apparatuses, and non-transitory computer-readable medium described herein may further include operations, features, means, or instructions for receiving the data message over a first data resource, where a first starting symbol of the first control message or a second starting symbol of the second control message, or both, occur after a third starting symbol of the data message.

Some examples of the method, apparatuses, and non-transitory computer-readable medium described herein may further include operations, features, means, or instructions for identifying an earliest starting symbol of a HARQ feedback resource based on a HARQ processing period and a latest of a first ending symbol of the first control message, a second ending symbol of the second control message, or a third ending symbol of the data message.

Some examples of the method, apparatuses, and non-transitory computer-readable medium described herein may further include operations, features, means, or instructions for identifying a HARQ feedback resource based on a HARQ reporting offset and latest of a first ending symbol of the first control message, a second ending symbol of the second control message, or a third ending symbol of the data message.

In some examples of the method, apparatuses, and non-transitory computer-readable medium described herein, the first control message may include operations, features, means, or instructions for soft-combining the first control message and the second control message.

In some examples of the method, apparatuses, and non-transitory computer-readable medium described herein, the first control message includes first control information and the second control message includes second control information, the first control information and the second control information being different.

Some examples of the method, apparatuses, and non-transitory computer-readable medium described herein may further include operations, features, means, or instructions for receiving the first control message over a first frequency bandwidth and the second control message over a second frequency bandwidth, where the first control message and the second control message indicate a location of the first data resource in the second frequency bandwidth.

In some examples of the method, apparatuses, and non-transitory computer-readable medium described herein, a carrier indicator field of the first control message may be different than a carrier indicator field of the second control message.

Some examples of the method, apparatuses, and non-transitory computer-readable medium described herein may further include operations, features, means, or instructions for receiving the first control message during a first time interval and the second control message during a second time interval, the second time interval occurring no earlier than the first time interval, where the first control message and the second control message indicate a location of the first data resource in a third time interval and receiving the data message during the third time interval.

Some examples of the method, apparatuses, and non-transitory computer-readable medium described herein may further include operations, features, means, or instructions for identifying a fourth time interval based on receiving the second control message during the second time interval and receiving the data message during the third time interval, where the fourth time interval occurs no earlier than the second time interval and the third time interval and may be offset from a later of the second time interval and the third time interval and reporting HARQ feedback during the fourth time interval.

In some examples of the method, apparatuses, and non-transitory computer-readable medium described herein, the offset may be based on a time location of the third time interval and a processing time for HARQ feedback.

In some examples of the method, apparatuses, and non-transitory computer-readable medium described herein, the third time interval occurs after the first time interval and the second time interval.

In some examples of the method, apparatuses, and non-transitory computer-readable medium described herein, the third time interval may be equivalent to the first time interval, and both the first time interval and the third time interval may be before the second time interval.

Some examples of the method, apparatuses, and non-transitory computer-readable medium described herein may further include operations, features, means, or instructions for identifying a fourth time interval based on receiving the second control message during the second time interval after receiving the data message during the third time interval, where the fourth time interval occurs no earlier than and may be offset from the second time interval and reporting HARQ feedback during the fourth time interval.

In some examples of the method, apparatuses, and non-transitory computer-readable medium described herein, the third time interval may be equivalent to the second time interval.

In some examples of the method, apparatuses, and non-transitory computer-readable medium described herein, the third time interval occurs after the first time interval and before the second time interval.

Some examples of the method, apparatuses, and non-transitory computer-readable medium described herein may further include operations, features, means, or instructions for identifying a fourth time interval based on receiving the second control message during the second time interval after receiving the data message during the third time interval, where the fourth time interval occurs no earlier than and may be offset from the second time interval and reporting HARQ feedback during the fourth time interval.

In some examples of the method, apparatuses, and non-transitory computer-readable medium described herein, a delay indicator field of the second control message indicates that the first data resource occurs before the second time interval.

In some examples of the method, apparatuses, and non-transitory computer-readable medium described herein, a delay indicator field of the first control message may be different than a delay indicator field of the second control message.

In some examples of the method, apparatuses, and non-transitory computer-readable medium described herein, the first control message may include operations, features, means, or instructions for decoding the data message based on the first control information or the second control information, or both.

Some examples of the method, apparatuses, and non-transitory computer-readable medium described herein may further include operations, features, means, or instructions for comparing the first control information and the second control information, determining that a parameter of the first control information may be different than the parameter of the second control information, the parameter being associated with the data message and refraining from decoding the data message based on the determining.

In some examples of the method, apparatuses, and non-transitory computer-readable medium described herein, the parameter includes any one of a resource allocation, a modulation and coding scheme, a rank, a demodulation reference signal port, or a redundancy version.

In some examples of the method, apparatuses, and non-transitory computer-readable medium described herein, the first control message indicates a first data resource and the second control message indicates a second data resource.

In some examples of the method, apparatuses, and non-transitory computer-readable medium described herein, receiving the data message may include operations, features, means, or instructions for decoding the first data message or the second data message based on receiving the signal, or both.

In some examples of the method, apparatuses, and non-transitory computer-readable medium described herein, the decoding includes soft-combining the first data message and the second data message.

Some examples of the method, apparatuses, and non-transitory computer-readable medium described herein may further include operations, features, means, or instructions for maintaining a joint HARQ buffer for the first data message and the second data message based on the soft-combining.

Some examples of the method, apparatuses, and non-transitory computer-readable medium described herein may further include operations, features, means, or instructions for maintaining a first HARQ buffer for the first data message and a second HARQ buffer for the second data message.

In some examples of the method, apparatuses, and non-transitory computer-readable medium described herein, the first control channel candidate resource and the first data resource may be associated with a first HARQ transmission of a first HARQ process and the second control channel candidate resource and the second data resource may be associated with a retransmission of the first HARQ transmission, where the decoding may include operations, features, means, or instructions for decoding the second control message received over the second control channel candidate resource, where the second control message indicates the first data resource and the second data resource based on the first HARQ process and in part on the correspondence.

In some examples of the method, apparatuses, and non-transitory computer-readable medium described herein, receiving the data message may include operations, features, means, or instructions for buffering a second signal received during the first data resource before receiving the second data message, the second signal corresponding to the first data message, identifying the first data message based on the second data message and the first HARQ process and soft-combining the first data message and the second data message.

Some examples of the method, apparatuses, and non-transitory computer-readable medium described herein may further include operations, features, means, or instructions for determining a correspondence between the first control message and the second control message based on the receiving.

In some examples of the method, apparatuses, and non-transitory computer-readable medium described herein, the decoding may include operations, features, means, or instructions for decoding the first control message and refraining from decoding the second control message based on successfully decoding the first control message and the determining.

A method of wireless communication at a wireless device is described. The method may include monitoring a first control channel candidate resource and a second control channel candidate resource, decoding, based on the monitoring, a first control message in the first control channel candidate resource and a second control message in the second control channel candidate resource, where the first control message and the second control message indicate at least one data resource, determining, based on the decoding, a correspondence between the first control channel candidate resource and the second control channel candidate resource, and receiving a data message over the at least one data resource, where the data message conveys information for a single transport block.

An apparatus for wireless communication at a wireless device is described. The apparatus may include a processor, memory in electronic communication with the processor, and instructions stored in the memory. The instructions may be executable by the processor to cause the apparatus to monitor a first control channel candidate resource and a second control channel candidate resource, decode, based on the monitoring, a first control message in the first control channel candidate resource and a second control message in the second control channel candidate resource, where the first control message and the second control message indicate at least one data resource, determine, based on the decoding, a correspondence between the first control channel candidate resource and the second control channel candidate resource, and receive a data message over the at least one data resource, where the data message conveys information for a single transport block.

Another apparatus for wireless communication at a wireless device is described. The apparatus may include means for monitoring a first control channel candidate resource and a second control channel candidate resource, decoding, based on the monitoring, a first control message in the first control channel candidate resource and a second control message in the second control channel candidate resource, where the first control message and the second control message indicate at least one data resource, determining, based on the decoding, a correspondence between the first control channel candidate resource and the second control channel candidate resource, and receiving a data message over the at least one data resource, where the data message conveys information for a single transport block.

A non-transitory computer-readable medium storing code for wireless communication at a wireless device is described. The code may include instructions executable by a processor to monitor a first control channel candidate resource and a second control channel candidate resource, decode, based on the monitoring, a first control message in the first control channel candidate resource and a second control message in the second control channel candidate resource, where the first control message and the second control message indicate at least one data resource, determine, based on the decoding, a correspondence between the first control channel candidate resource and the second control channel candidate resource, and receive a data message over the at least one data resource, where the data message conveys information for a single transport block.

In some examples of the method, apparatuses, and non-transitory computer-readable medium described herein, the first control message and the second control message indicate a first data resource.

In some examples of the method, apparatuses, and non-transitory computer-readable medium described herein, the first control message may include operations, features, means, or instructions for identifying that the first control information and the second control information may be the same, where determining the correspondence may be based on the identifying.

In some examples of the method, apparatuses, and non-transitory computer-readable medium described herein, the monitoring may include operations, features, means, or instructions for monitoring the first control channel candidate resource and the second control channel candidate resource in a first set of control channel resources of the set of control channel resources; or and monitoring the first control channel candidate resource in the first set of control channel resources of the set of control channel resources and the second control channel candidate resource in a second set of control channel resources of the set of control channel resources.

In some examples of the method, apparatuses, and non-transitory computer-readable medium described herein, the first control message indicates a first data resource and the second control message indicates a second data resource.

In some examples of the method, apparatuses, and non-transitory computer-readable medium described herein, the first control message may be associated with a first HARQ process identifier and the second control message may be associated with the first HARQ process identifier, the first control message and the second control message may be decoded before HARQ feedback associated with the first HARQ process identifier may be transmitted and the correspondence may be determined based on decoding the first control message and the second control message before the HARQ feedback.

In some examples of the method, apparatuses, and non-transitory computer-readable medium described herein, the receiving may include operations, features, means, or instructions for determining that the first data message and the second data message convey the information for the single transport block based on determining the correspondence.

A method of wireless communication at a wireless device is described. The method may include decoding a control message in a first control channel candidate resource, identifying, based on the decoding, a first data resource and a second data resource, where a first data message is received over the first data resource and a second data message is received over the second data resource, determining a correspondence between the first data resource and the second data resource based on decoding the control message, and decoding, based on the determining, the first data message received over the first data resource and the second data message received over the second data resource.

An apparatus for wireless communication at a wireless device is described. The apparatus may include a processor, memory in electronic communication with the processor, and instructions stored in the memory. The instructions may be executable by the processor to cause the apparatus to decode a control message in a first control channel candidate resource, identify, based on the decoding, a first data resource and a second data resource, where a first data message is received over the first data resource and a second data message is received over the second data resource, determine a correspondence between the first data resource and the second data resource based on decoding the control message, and decode, based on the determining, the first data message received over the first data resource and the second data message received over the second data resource.

Another apparatus for wireless communication at a wireless device is described. The apparatus may include means for decoding a control message in a first control channel candidate resource, identifying, based on the decoding, a first data resource and a second data resource, where a first data message is received over the first data resource and a second data message is received over the second data resource, determining a correspondence between the first data resource and the second data resource based on decoding the control message, and decoding, based on the determining, the first data message received over the first data resource and the second data message received over the second data resource.

A non-transitory computer-readable medium storing code for wireless communication at a wireless device is described. The code may include instructions executable by a processor to decode a control message in a first control channel candidate resource, identify, based on the decoding, a first data resource and a second data resource, where a first data message is received over the first data resource and a second data message is received over the second data resource, determine a correspondence between the first data resource and the second data resource based on decoding the control message, and decode, based on the determining, the first data message received over the first data resource and the second data message received over the second data resource.

In some examples of the method, apparatuses, and non-transitory computer-readable medium described herein, decoding the control message further may include operations, features, means, or instructions for identifying that the control message includes a first resource allocation field corresponding to the first data resource and a second resource allocation field corresponding to the second data resource, where the correspondence between the first data resource and the second data resource may be based on the identifying.

Some examples of the method, apparatuses, and non-transitory computer-readable medium described herein may further include operations, features, means, or instructions for identifying a location of the first data resource based on the first resource allocation field and a location of the second data resource based on the second resource allocation field.

In some examples of the method, apparatuses, and non-transitory computer-readable medium described herein, the control message may include operations, features, means, or instructions for receiving a signal indicating the correspondence between the first data resource and the second data resource, identifying a location of the first data resource based on the first resource allocation field and identifying a location of the second data resource based on receiving the signal and the location of the first data resource.

Some examples of the method, apparatuses, and non-transitory computer-readable medium described herein may further include operations, features, means, or instructions for reporting HARQ feedback for the first data message and the second data message in a single uplink transmission.

In some examples of the method, apparatuses, and non-transitory computer-readable medium described herein, the first data message and the second data message convey information for a single transport block.

A method of wireless communication at a base station is described. The method may include determining a correspondence between a first control channel candidate resource and a second control channel candidate resource, transmitting a first control message over the first control channel candidate resource and a second control message over the second control channel candidate resource, where the first control message and the second control message indicate at least one data resource, and transmitting a data message over the at least one data resource, where the data message conveys information for a single transport block.

An apparatus for wireless communication at a base station is described. The apparatus may include a processor, memory in electronic communication with the processor, and instructions stored in the memory. The instructions may be executable by the processor to cause the apparatus to determine a correspondence between a first control channel candidate resource and a second control channel candidate resource, transmit a first control message over the first control channel candidate resource and a second control message over the second control channel candidate resource, where the first control message and the second control message indicate at least one data resource, and transmit a data message over the at least one data resource, where the data message conveys information for a single transport block.

Another apparatus for wireless communication at a base station is described. The apparatus may include means for determining a correspondence between a first control channel candidate resource and a second control channel candidate resource, transmitting a first control message over the first control channel candidate resource and a second control message over the second control channel candidate resource, where the first control message and the second control message indicate at least one data resource, and transmitting a data message over the at least one data resource, where the data message conveys information for a single transport block.

A non-transitory computer-readable medium storing code for wireless communication at a base station is described. The code may include instructions executable by a processor to determine a correspondence between a first control channel candidate resource and a second control channel candidate resource, transmit a first control message over the first control channel candidate resource and a second control message over the second control channel candidate resource, where the first control message and the second control message indicate at least one data resource, and transmit a data message over the at least one data resource, where the data message conveys information for a single transport block.

In some examples of the method, apparatuses, and non-transitory computer-readable medium described herein, the first control channel candidate resource and the second control channel candidate resource may be in a first set of control channel resources of the set of control channel resources; or where the first control channel candidate resource may be in the first set of control channel resources of the set of control channel resources and the second control channel candidate resource may be in a second set of control channel resources of the set of control channel resources.

Some examples of the method, apparatuses, and non-transitory computer-readable medium described herein may further include operations, features, means, or instructions for transmitting a first data message conveying information for the single transport block over the first data resource.

Some examples of the method, apparatuses, and non-transitory computer-readable medium described herein may further include operations, features, means, or instructions for transmitting a first data message conveying information for the single transport block over the first data resource and a second data message conveying information for the single transport block over the second data resource.

Some examples of the method, apparatuses, and non-transitory computer-readable medium described herein may further include operations, features, means, or instructions for transmitting a signal indicating the correspondence between the first control channel candidate resource and the second control channel candidate resource.

In some examples of the method, apparatuses, and non-transitory computer-readable medium described herein, the first control message includes first control information and the second control message includes second control information, the first control information and the second control information being the same.

A method of wireless communication at a base station is described. The method may include determining a correspondence between a first data resource and a second data resource, transmitting a first control message over a first control candidate channel resource, where the first control message indicates a location of the first data resource or the second data resource, or both, and transmitting a first data message over the first data resource and a second data message over the second data resource.

An apparatus for wireless communication at a base station is described. The apparatus may include a processor, memory in electronic communication with the processor, and instructions stored in the memory. The instructions may be executable by the processor to cause the apparatus to determine a correspondence between a first data resource and a second data resource, transmit a first control message over a first control candidate channel resource, where the first control message indicates a location of the first data resource or the second data resource, or both, and transmit a first data message over the first data resource and a second data message over the second data resource.

Another apparatus for wireless communication at a base station is described. The apparatus may include means for determining a correspondence between a first data resource and a second data resource, transmitting a first control message over a first control candidate channel resource, where the first control message indicates a location of the first data resource or the second data resource, or both, and transmitting a first data message over the first data resource and a second data message over the second data resource.

A non-transitory computer-readable medium storing code for wireless communication at a base station is described. The code may include instructions executable by a processor to determine a correspondence between a first data resource and a second data resource, transmit a first control message over a first control candidate channel resource, where the first control message indicates a location of the first data resource or the second data resource, or both, and transmit a first data message over the first data resource and a second data message over the second data resource.

In some examples of the method, apparatuses, and non-transitory computer-readable medium described herein, the first control message includes a first resource allocation field indicating a location of the first data resource and a second allocation field indicating a location of the second data resource.

In some examples of the method, apparatuses, and non-transitory computer-readable medium described herein, the first control message may include operations, features, means, or instructions for transmitting a signal indicating the correspondence between the first data resource and the second data resource, where a location of the second data resource may be based on the location of the first data resource and the signal.

In some examples of the method, apparatuses, and non-transitory computer-readable medium described herein, the first data message and the second data message convey information for a single transport block

DETAILED DESCRIPTION

Figure 1:
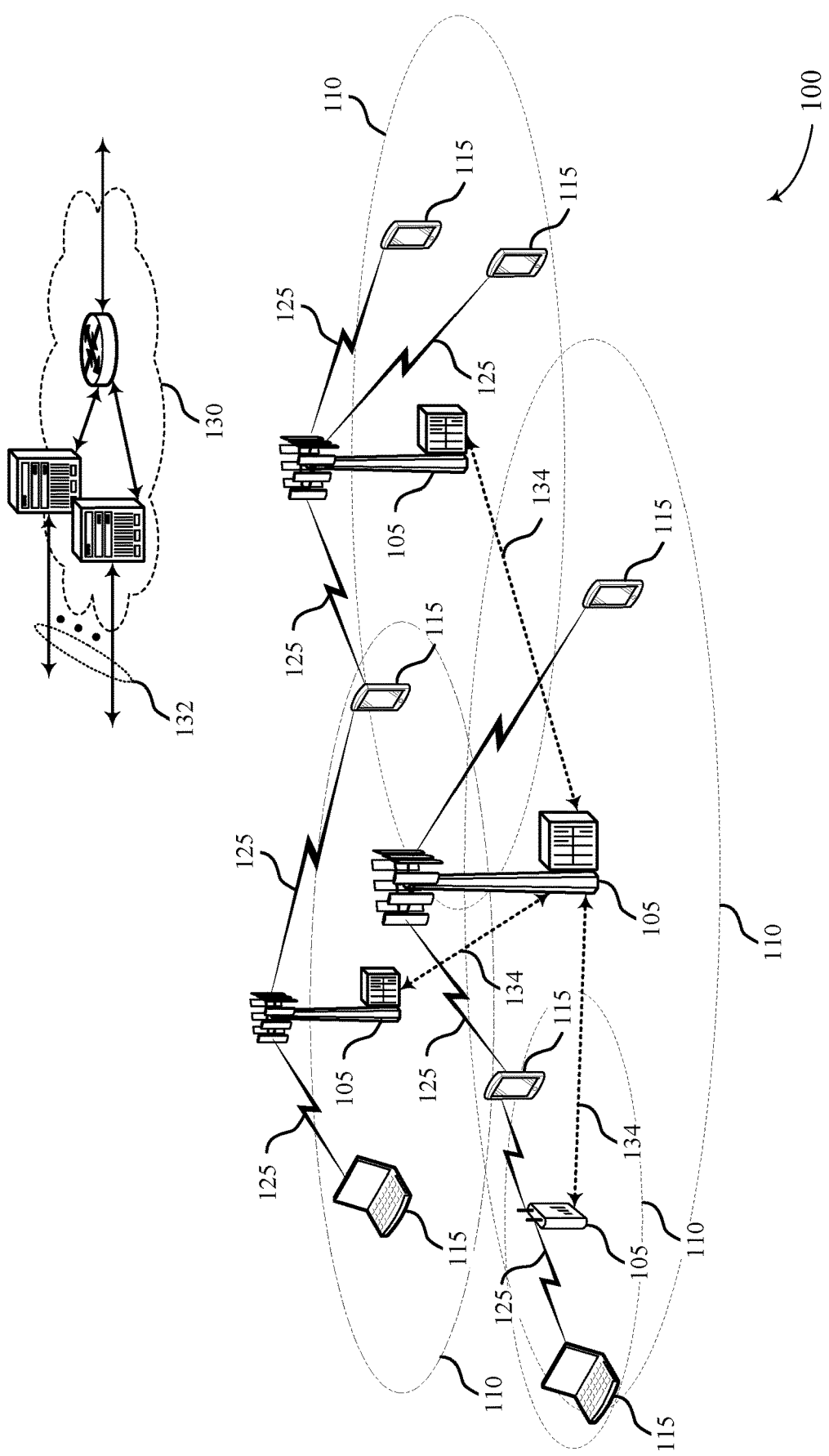
FIG. 1 illustrates an example of a system for wireless communications that supports communication resource pairing and repetition in accordance with aspects of the present disclosure.

A communications system may use wireless packets to communicate information between wireless devices. A wireless packet may include a data portion and a control portion. The data portion may include user information (e.g., the content of an email or text message) and/or higher layer control signaling (e.g., routing information). The control portion may include control information for receiving and processing the wireless packet itself.

Communication resources of a wireless network may be used to communicate a wireless packet between wireless devices. Such communication resources may correspond to the physical (PHY) layer of the wireless network. The communication resources may be partitioned into time and frequency resources and grouped into different types of resources. For instance, a subset of the time and frequency resources may be designated as control resources—which may be used by a physical downlink control channel (PDCCH) or a physical uplink control channel (PUCCH). And another subset of the time and frequency resources may be designated as data resources—which may be used by a physical downlink shared channel (PDSCH) or a physical uplink shared channel (PUSCH).

In some cases, different types of communication resources may be used together to communicate a wireless packet between particular devices. For instance, a control portion of a wireless packet may be transmitted over particular control resources and a data portion of the wireless packet may be transmitted over particular data resources. The transmitted control portion may be referred to as a control message and the transmitted data portion may be referred to as a data message. In some cases, the data message carries information for a transport block (TB), which may correspond to a medium access control (MAC) protocol data unit (PDU).

As suggested above, the control portion of a data packet may include information for receiving the user portion of the data packet over the PHY layer—e.g., the control information may indicate a location of data resources used for transmitting the data portion, parameters used for transmitting the data portion, and the like. Thus, to receive a wireless packet, control resources used to transmit the wireless packet may be decoded before data resources used to transmit the wireless packet are decoded.

In certain wireless networks, the wireless packet transmissions to wireless devices are scheduled by a central scheduling node, such as a base station, unbeknownst to a receiving device. In such cases, a wireless data packet intended for a wireless device may be transmitted without the knowledge of the receiving device. Thus, control resources of the wireless network may be continuously monitored and decoded by a wireless device to determine whether data intended for the wireless device has been scheduled by the scheduling node. This process may also be referred to a blind decoding. To reduce the processing burden of blind decoding, a portion of the control resources, which may be referred to as control channel candidate resources, may be configured for monitoring by one or more wireless devices. That is, control information for one or more wireless device may be transmitted in certain control resources, and only the certain control resources may be monitored by the one or more wireless devices to determine whether a wireless packet is to be transmitted to the wireless device. In some cases, a wireless device may be configured to monitor certain control channel candidate resources during particular sets of control resources.

Different types of wireless packets may be transmitted over a wireless network according to different timing and/or reliability objectives. For instance, for low latency data, it may be desirable that a transmission of a wireless packet is completed within a short amount of time. While for high-reliability data, it may be desirable that a reliability of a transmission of a wireless packet is high—e.g., that an error rate associated with transmissions of the second data type is low. In some cases, for high reliability data, it may be desirable that a reliability of a wireless packet transmission is high regardless of how long the transmission takes. For high-reliability, low latency data, it may desirable that a transmission of a wireless packet is both completed in a short time and with a high reliability. The transmission of such data may also be referred to as an ultra-reliable low latency communication (URLLC). In some examples, an URLLC may have a high probability of being successfully delivering a wireless packet within a short amount of time—e.g., an URLLC may be transmitted within 1 millisecond (ms) and URLLCs may have a block error rate (BLER) of less than 1e-6.

A number of techniques may be employed to increase the reliability of a wireless packet transmission, including increasing transmission power, changing a modulation coding scheme (MCS), and the like. One technique for increasing reliability (which may be referred to as repetition), may be to transmit multiple copies of a wireless packet. The copies of the wireless packet may each be received and decoded by an intended device. In such cases, the device may successfully decode the wireless packet if it successfully decodes just one of the copies. In some cases, the device may successfully decode the wireless packet even if it fails to decode any of the copies—e.g., by combining the copies and decoding the combined version in a process that may be referred to as soft combining.

But as suggested above, when increasing the transmission reliability of a wireless packet used for URLLC (or a URLLC packet) it is often necessary to also adhere to the strict timing constraints of URLLCs. As also discussed above, a data portion of a wireless packet may be received after a control portion. Thus, increasing the reliability of a URLLC packet transmission used by way of repetition may result in a failure to successfully deliver the URLLC within a designated period (or a URLLC period).

As discussed herein, to increase the reliability of a URLLC packet transmission, at least a portion of the URLLC packet may be repeated within a URLLC period.

For example, a control portion of a URLLC packet (which may also be referred to as a control message) may be transmitted multiple times (e.g., twice) within a URLLC period, where each control portion may indicate information for receiving and processing a corresponding data portion of the URLLC packet (which may also be referred to as a data message). In this way, communication errors associated with the failed decoding of a control message may be decreased. In some cases, the multiple control messages may be transmitted in a single set of control resources or across multiple sets of control resources (e.g., over different frequencies or in different time intervals). In some cases, a single data message of the URLLC packet is transmitted along with the multiple control messages, and the multiple control messages indicate a location of the single data message. In some examples, the multiple control messages carry the same control information. When the control messages carry the same control information, decoding techniques such as soft-decoding may be used. In other examples, the multiple control messages carry different control information (e.g., if two control messages are received over different carriers, then a carrier indicator field of the two control messages may be different.

In other cases, the data message of the URLLC packet is transmitted multiple times along with the multiple control messages, and each of the multiple control messages indicates a location of a respective data message. In this way, communication errors associated with the failed decoding of a data message may be decreased. In some cases, decoding techniques such as soft-decoding may be performed using both of the data messages, further decreasing communication errors.

In another example, multiple data messages for a URLLC packet may be transmitted, along with a single control message for the URLLC packet, within a URLLC period to reduce communication errors associated with the failed decoding of a data message may be decreased.

But as previously mentioned, wireless data packet may be transmitted without the knowledge of, and control message may be blindly decoded by, an intended receiving device. Thus in some cases, receiving multiple control messages for a single data packet may cause confusion at the receiving device—e.g., the receiving device may be unsure of how to process a second control message for a single data packet. In other cases, the receiving device may not receive additional control messages after identifying a first control message regardless of whether the receiving device successfully decodes the first control message—e.g., because the wireless device only expects one control message to be sent. And in some cases, a device may be unaware when multiple data messages for a single data packet have been transmitted—e.g., because the wireless device only expects one data message to be sent per control message.

As discussed herein, to avoid confusion at a receiving device and to support the transmission of multiple control and/or data messages for a URLLC packet within a URLLC period, enhanced repetition techniques may be implemented.

For example, multiple control and/or data messages transmitted for a single URLLC packet may be linked, either explicitly or implicitly, so that a receiving device may determine when multiple messages are being sent for a URLLC packet and process the URLLC packet accordingly.

As discussed herein, to explicitly link the transmission of multiple control messages for a single URLLC packet, a scheduling node may transmit a signal to a receiving device that indicates a correspondence between certain control channel candidate resources. For example, a scheduling node may transmit radio resource control (RRC) signaling that indicates that a first control channel candidate resource corresponds to (or is linked with) a second control channel candidate resource. And a receiving device may determine that control messages received over the first and second control channel candidate resources are for a single data packet. In other examples, the control messages themselves may contain an indication of a correspondence with another control message.

As discussed herein, to implicitly link the transmission of multiple control messages, control information may be included within the control messages that indicates a correspondence between the multiple control messages. For example, the control messages may include the same, or a same portion of, control information and a receiving device may determine that the control messages are linked after decoding the control messages and determining that the control information, or a portion of the control information, across the control messages is the same. In another example, the control messages may have the same hybrid automatic repeat request (HARQ) identifiers for a HARQ process and a receiving device may determine that the control messages are linked after determining that the control messages include the same HARQ identifiers and were received before HARQ feedback associated with the HARQ identifiers was transmitted by the UE.

As discussed herein, to explicitly link the transmission of multiple data messages, a scheduling node may transmit a signal to a receiving device that indicates a correspondence between certain data resources. For example, a scheduling node may transmit RRC signaling that indicates that a first data resource corresponds to (or is linked with) a second data resource. The scheduling node may also transmit a control message indicating a location of the first data resource and a receiving device may determine a location of the second data resource based on the location of the first data resource and the RRC signaling. The receiving device may then determine that a first data message transmitted over the first data resource is linked with a second data message transmitted over the second data resource. In some cases, the first and second data messages are associated with a same TB, and in other cases, the first and second data messages are associated with different TBs.

As discussed herein, to implicitly link the transmission of multiple data messages, control information may be included within a control message that indicates a correspondence between the multiple data messages. For example, a single control message for the URLLC packet may include multiple resource allocation fields corresponding to respective data resources. And a receiving device may determine that a first data message transmitted over the first data resource is linked with a second data message transmitted over the second data resource. In some cases, the first and second data messages are associated with a same TB, and in other cases, the first and second data messages are associated with different TBs.

Although the above has been generally discussed within the context of URLLC packets, the features of the disclosure introduced above may similarly be applied to other types of wireless packet. Also, aspects of the features of the disclosure introduced above may be performed alone or in combination with one another. For example, each control message of multiple control messages transmitted for a wireless packet may indicate multiple data messages transmitted for the wireless packet.

Features of the disclosure introduced above are further described below in the context of a wireless communication system. Specific examples are then described of control channel and data resource configurations for communication resource pairing and repetition. These and other features of the disclosure are further illustrated by and described with reference to apparatus diagrams, system diagrams, and flowcharts that relate to communication resource pairing and repetition.

FIG. 1 illustrates an example of a wireless communications system 100 that supports communication resource pairing and repetition in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the PHY layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

In a system employing multi-carrier modulation (MCM) techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, wireless communications system 100 may transmit repetitions of control and/or data information in accordance with low latency communication parameters. In some cases, wireless communications system 100 may implement explicit or implicit signaling to support the repetitions of control and/or data information.

In some cases, a UE 115 may receive a signal indicating a correspondence between a first control channel candidate resource and a second control channel candidate resource. After receiving the signaling, the UE 115 may monitor the first control channel candidate resource and the second control channel candidate resource and may decode a first control message received over the first control channel candidate resource or a second control message received over the second control channel candidate resource. In some cases, the first control message and the second control message indicate one or more data resources. Subsequently, the UE 115 may receive a data message over the one or more data resource. In some cases, the data message conveys information for a single transport block.

In some cases, a UE 115 may monitor a first control channel candidate resource and a second control channel candidate resource. The UE 115 may decode a first a first control message in the first control channel candidate resource and a second control message in the second control channel candidate resource. In some cases, the first control message and the second control message indicate one or more data resources. The UE 115 may determine a correspondence between the first control channel candidate resource and the second control channel candidate resource on the decoding. Subsequently, the UE 115 may receive a data message over the one or more data resource. In some cases, the data message conveys information for a single transport block.

In some cases, a UE 115 may decode a control message in a first control channel candidate resource. The UE 115 may then identify a first data resource and a second data resource based on the decoding. In some cases, a first data message is received over the first data resource and a second data message is received over the second data resource. The UE 115 may determine a correspondence between the first data resource and the second data resource based at least in part on decoding the control message. And the UE 115 may decode the first data message received over the first data resource and the second data message received over the second data resource based on the determined correspondence.

In some cases, a base station 105 may determine a correspondence between a first control channel candidate resource and a second control channel candidate resource. The base station 105 may then transmit a first control message over the first control channel candidate resource and a second control message over the second control channel candidate resource. In some cases, the first control message and the second control message indicate at least one data resource. And the base station 105 may transmit a data message over the at least one data resource, where the data message conveys information for a single transport block In some cases, a base station 105 may determine a correspondence between a first data resource and a second data resource. The base station 105 may then transmit a first control message over a first control candidate channel resource, where the first control message indicates a location of the first data resource or the second data resource, or both. And the base station 105 may transmit a first data message over the first data resource and a second data message over the second data resource.

Figure 2:
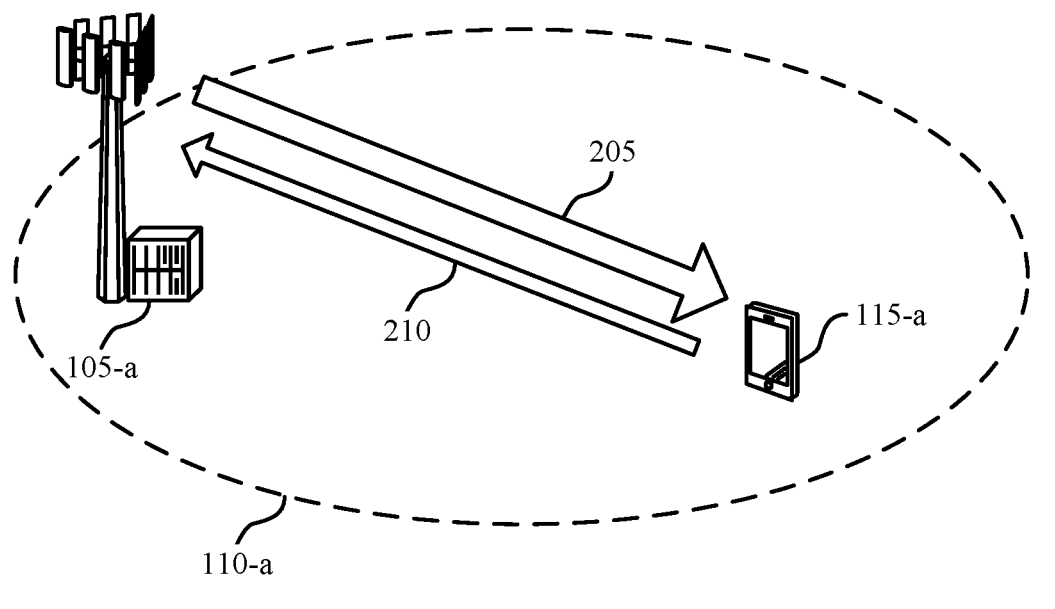
FIG. 2 illustrates an example of a wireless communication subsystem that supports communication resource pairing and repetition in accordance with various aspects of the present disclosure.

FIG. 2 illustrates an example of a wireless communications subsystem 200 that supports communication resource pairing and repetition in accordance with various aspects of the present disclosure. Wireless communications subsystem 200 may include UE 115-a and base station 105-a, which may be examples of a UE 115 or a base station 105, as described above with reference to FIG. 1. Wireless communications subsystem 200 may also include downlink 205 and uplink 210. Base station 105-a may use downlink 205 to convey control and data information to UE 115-a. And UE 115-a may use uplink 210 to convey control and data information to base station 105-a. In some cases, downlink 205 uses different time and/or frequency resources than uplink 210.

As discussed herein, repetitive (or redundant) transmissions of packets may increase a reliability of packet transmissions, but are limited for URLLC packets by strict timing constraints. Thus, to perform repetitive transmission of a URLLC packet, a wireless system may communicate multiple control and/or data messages for the URLLC packet within a URLLC period.

In some examples for performing repetitive transmissions of a URLLC packet, base station 105-a may configure (e.g., using RRC signaling) UE 115-a to monitor particular control channel candidate resource during certain sets of control channel resources, which may also be referred to as CORE-SETs or search spaces. The control channel candidate resources may correspond to portions of one or more CORE-SETs. After configuring the control channel candidate resources for UE 115-a, base station 105-a may schedule one or more URLLC packets for transmission to UE 115-a. In some cases, base station 105-a may schedule the transmission of a control message for a URLLC packet over a first control channel candidate resource and a second control channel candidate resource and the transmission of a data message for the URLLC packet over a first data resource. By transmitting the control message over both the first and second control channel candidate resource, errors associated with failing to decode the control message may be reduced. In some cases, base station 105-a may schedule the transmission of a data message for the URLLC packet over a first data resource and a second data resource. By transmitting the data message over both the first and second data resource, errors associated with failing to decode the data message may be reduced.

In some cases, the first control channel candidate resource and the second control channel candidate resource are located in different frequency ranges, on different carriers, or in different time intervals. In some cases, the first control channel candidate resource is located in a different CORESET than the second control channel candidate resource as discussed herein and in more detail with respect to FIG. 3A. In some cases, the first control channel candidate resource is located in a same CORESET then the second control channel candidate resource as discussed herein and in more detail with respect to FIG. 3B. In some cases, the first control channel candidate resource and the second control channel candidate resource occur before the data resource in time as discussed herein and in more detail with respect to FIG. 4A. In some cases, the first control channel candidate resource occurs before the data resource and the second control channel candidate resource occurs after the first control channel candidate resource in time as discussed herein and in more detail with respect to FIGS. 4B and 4C.

Base station 105-a may then transmit a first control message for the URLLC packet over a first control channel candidate resource and a second control message of the URLLC packet during a second control channel candidate resource. In some cases, the first control message and the second control message may indicate a location of data resource(s) for corresponding data message(s). The first control and second control messages may also include additional parameters for receiving data message(s) over the data resource(s). In some cases, the first control message and the second control message indicate a location of a single data resource as discussed herein and in more detail with respect to FIGS. 4A to 4C. In some cases, the first control message indicates a location of a first data resource and the second control message indicates a location of a second data resource as discussed herein and in more detail with respect to FIGS. 5A and 5B.

After transmitting the first and second control messages, base station 105-a may also transmit the data message for the URLLC packet. In some cases, the data message corresponds to a single TB or a MAC PDU.

UE 115-a may monitor the first control channel candidate resource and the second control channel candidate resource based on the previous configuration. After base station 105-a transmits the first and second control messages, UE 115-a may receive a signal carrying the first and second control messages and may detect the first and second control message during a process which may be referred to as blind decoding. During blind decoding, UE 115-a may decode each signal received over each control channel candidate resource to determine whether a control message intended for UE 115-a was transmitted by base station 105-a. After blind decoding the control channel candidate resources, UE 115-a may identify the first control message or the second control message, or both. In some cases, UE 115-a may fail to decode one of the control messages or both of the control messages. In some examples after failing to decode both of the control messages individually, UE 115-a may decode the control messages together (e.g., using soft-decoding techniques) to determine the control information included in the control messages.

After successfully decoding the control message(s), UE 115-a may determine a location of data resource(s) conveying a data message for the URLLC packet. In some cases, UE 115-a may identify multiple data resources carrying the same data message based on the determining. As discussed herein, in some cases, the location of the data resource(s) may be located before one or both of the control channel candidate resources, after both of the control channel candidate resources, on a different set of frequencies, on a different carrier, in a different time slot, in a different mini-slot, or some combination thereof.

After identifying the location of the data resource(s), UE 115-a may receive a signal carrying the data message over the data resource(s). When UE 115-a receives a first data message over a first data resource and a repetition of the first data message over a second data resource, errors resulting from failures to decode a data message may be reduced.

As discussed herein, transmitting repetitive control and data messages within a URLLC period may cause confusion at a receiving device, such as a UE—e.g., because the receiving device may not be expecting additional control and/or data messages. To avoid confusion at a receiving device while retaining the increased reliability of repetitive transmissions, a wireless system may implement techniques for communicating a relationship between control and data messages to a receiving device.

In some examples for avoiding confusion, a wireless system may introduce explicit indications to give prior notice of pairings between particular control and data resources. For example, base station 105-a may communicate RRC signaling to UE 115-a that indicates a correspondence between certain control channel candidate resources. For instance, base station 105-a may communicate signaling indicating a link between a first control channel candidate resource having a first index in a first CORESET and a second control channel candidate resource having a second index in a second CORESET. In some cases, base station 105-a may communicate signaling that indicates a pairing between a first CORESET and a second CORESET, along with an indication that each control channel candidate resource in the first CORESET is paired with a control channel candidate resource in the second CORESET that shares a same index value. In some cases, the indication indicates that a subset of control channel candidate resources in the first CORESET is paired with control channel candidate resources in the second CORESET sharing a same index value. In another instance, base station 105-a may communicate signaling indicating a link between a first control channel candidate resource having a first index in a first CORESET and a second control channel candidate resource having a second index in the first CORESET that is offset from the first index by a certain amount.

In some examples for avoiding confusion, a wireless system may introduce implicit indications enabling a receiving device to determine whether particular control and data resources are paired. For example, base station 105-a may transmit a first control message containing control information (e.g., downlink control information (DCI)) over a first control channel candidate resource and a second, paired control message containing the same control information over a second control channel candidate resource. UE 115-a may receive and decode the first and second control messages and may determine that the first and second control messages are paired based on obtaining the same DCI for both control messages. In some cases, a particular portion of the first and second control message may be the same, and UE 115-a may determine that the first and second control messages are paired based on obtaining the same DCI portions for both control messages. In another example, base station 105-*a* may transmit a first control message having a first HARQ identifier and a second control message having the first HARQ identifier before HARQ feedback associated the first HARQ identifier is received, and UE 115-*a* may determine that the first control message and the second control message are paired based on identifying that the first and second control message share a same HARQ identifier.

In another example, for performing repetitive transmissions of a URLLC packet, base station 105-*a* may schedule the transmission of URLLC packet(s) for transmission to UE 115-*a*. As discussed herein, base station 105-*a* may configure (e.g., in RRC signaling) UE 115-*a* to monitor certain control channel candidate resources of a CORESET. In some cases, base station 105-*a* may schedule the transmission of a control message of a URLLC packet over a first control channel candidate resource and a transmission of a data message of the URLLC packet over a first data resource and a second data resource. By transmitting the data message over both the first and second data resource, errors associated with failing to decode the data message may be reduced. In some cases, base station 105-*a* may schedule the transmission of a control message of a URLLC packet over a first control channel candidate resource and a transmission of a first data message of the URLLC packet over a first data resource and a second data message of another URLLC packet over a second data resource. In some cases, the first data resource and the second data resource are located in different frequency ranges, on different carriers, or in different time intervals.

After scheduling the control and data message transmissions, base station 105-*a* may transmit a control message over the first control channel candidate resource. In some cases, the control message may indicate a location of the first data resource and the second data resource, as will be discussed in more detail herein and with reference to FIG. 6A. In other cases, the control message may indication a location of only the first data resource, as will be discussed in more detail herein and with reference to FIG. 6B. Base station 105-*a* may also transmit a first data message over the first data resource and a second data message over the second data resource. In some cases, the first data message and the second data message convey information for a same TB. In some cases, the first data message conveys information for a first TB and the second data message conveys information for a second TB.

UE 115-*a* may monitor the first control channel candidate resource based on the configuration information received from base station 105-*a*. After base station 105-*a* transmits the control message, UE 115-*a* may receive a signal carrying the control message and detect the control message during blind decoding.

After successfully decoding the control message, UE 115-*a* may determine a location of the first data resource and/or the second data resource based on the information in the control message. In some examples, UE 115-*a* may determine a location of both the first data resource and the second data resource based on the control message—e.g., when the control message includes a first resource allocation field corresponding to a location of the first data resource and a second resource allocation field corresponding to a location of the second data resource. In some examples, UE 115-*a* may determine a location of the first data resource based on the control message—e.g., when the control message includes a single resource allocation field corresponding to a location of the first data resource. In scenarios in which UE 115-*a* determines only the location of the first data resource based on the control, UE 115-*a* may determine the location of the second data resource based on signaling (e.g., RRC signaling) received from base station 105-*a*. The signaling may indicate a correspondence between the first data resource and the second data resource. For instance, the signaling may indicate a time and frequency offset relative to the first data resource.

Figure 3A:
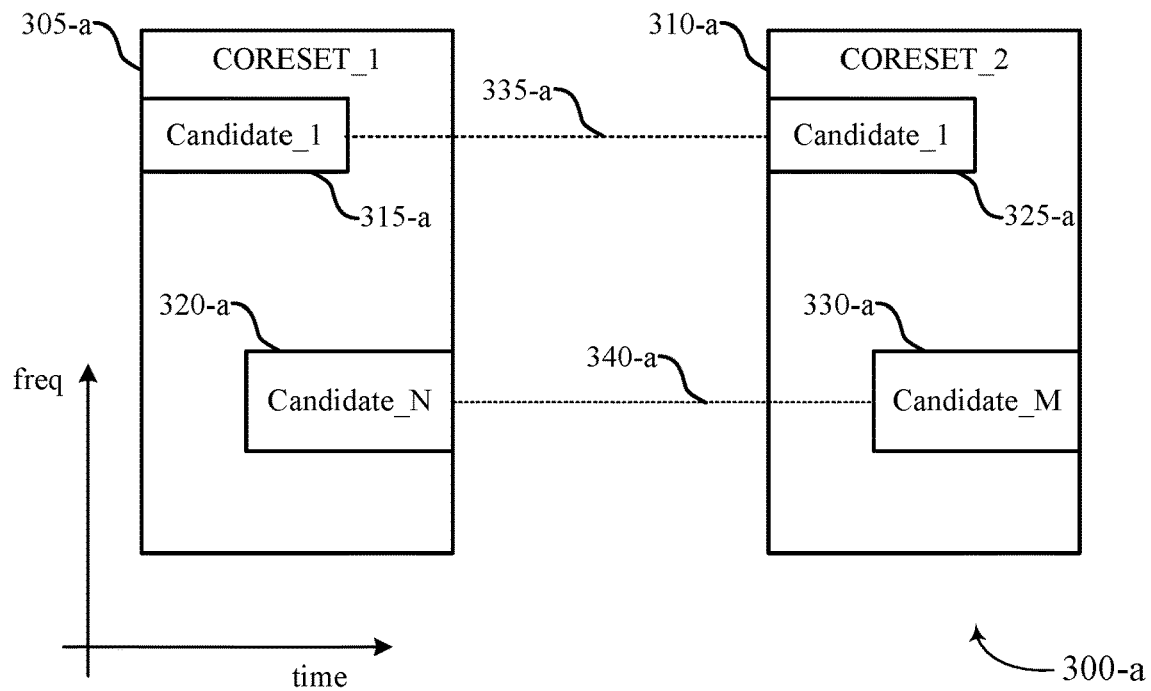
FIGS. 3A and 3B illustrate examples of control resource configurations that support communication resource pairing and repetition in accordance with various aspects of the present disclosure.

FIG. 3A illustrates an example of a control resource configuration that supports communication resource pairing and repetition in accordance with various aspects of the present disclosure. Control resource configuration 300-*a* may be an example configuration of control resources in a wireless system. Control resource configuration 300-*a* may include first CORESET 305-*a* and second CORESET 310-*a*. In some examples, the first CORESET 305-*a* and the second CORESET 310-*a* may be associated with or correspond to one or more search spaces.

First CORESET 305-*a* may be used to convey control information for particular wireless devices. First CORESET 305-*a* may be composed of a number of time and frequency resources that have been designated as control resources. First CORESET 305-*a* may also include a number of control channel candidate resources, such as first candidate resource 315-*a* and nth candidate resource 320-*a*.

Each control channel candidate resource may be associated with one or more wireless devices and a scheduling node may transmit control information for particular wireless devices in respective control channel candidate resources.

In some examples, first candidate resource 315-*a* may be composed of a number of control resources (e.g., control resource elements) and may be used to convey DCI for a particular wireless device. Nth candidate resource 320-*a* may also be composed of different control resources and may be used to convey DCI for the particular wireless device or another wireless device. Nth candidate resource 320-*a* may be offset from first candidate resource 315-*a* in time and/or frequency. In some cases, each control channel candidate resource may be assigned a unique index within a corresponding CORESET or search space. For example, first candidate resource 315-*a* may have an index of 1 and nth candidate resource 320-*a* may have an index of N.

Second CORESET 310-*a* may include second candidate resource 325-*a* and mth candidate resource 330-*a*. Second CORESET 310-*a* may be configured similarly as first CORESET 305-*a*. And second candidate resource 325-*a* and mth candidate resource 330-*a* be configured similarly as first candidate resource 315-*a* and nth candidate resource 320-*a*. In some cases, second CORESET 310-*a* may use different time and/or frequency resources than first CORESET 305-*a*. For example, second CORESET 310-*a* may use different time resources than first CORESET 305-*a*—e.g., subsequent time resources in a same time slot/mini-slot or in a different time slot/mini-slot. In some cases, second CORESET 310-*a* may use different frequency resources than first CORESET 305-*a*—e.g., overlapping or non-overlapping frequency resources. In some cases, second CORESET 310-*a* may be located on a different carrier than first CORESET 305-*a*. In some cases, second CORESET 310-*a* may be transmitted from a different transmission reception point (TRP) than first CORESET 305-*a*.

Second candidate resource 325-*a* and mth candidate resource 330-*a* may similarly use different time and/or frequency resources than first candidate resource 315-*a* and nth candidate resource 320-*a*. In some examples, second candidate resource 325-a may have an index of 1 and mth candidate resource 330-a may have an index of N.

In some examples, certain control channel candidate resources may be virtually linked across CORESETS or search spaces. As discussed herein, candidate resources that are linked may be used to transmit repetitions of a control message for a single transport block.

In some cases, a correspondence between control channel candidate resources may be explicitly indicated by a base station. For example, a base station may indicate (e.g., in RRC signaling) to one or more wireless device that certain control channel candidates are paired. In some examples, a base station signals a link between two control channel candidate resources. In some examples, a base station configures a wireless device to identify all or particular control channel candidate resource across CORESETS or search spaces that share a same index as paired and signals a link between two CORESETS or search spaces.

In an example for creating/indicating a correspondence between two candidate resources, first candidate resource 315-a may correspond to, or be virtually paired with, second candidate resource 325-a, as represented by first correspondence 335-a. And nth candidate resource 320-a may correspond to, or be virtually paired with, mth candidate resource 330-a, as represented by second correspondence 340-a. In some examples, a base station may configure a first wireless device to monitor first candidate resource 315-a and second candidate resource 325-a and a second wireless device to monitor nth candidate resource 320-a and mth candidate resource 330-a. The base station may also configure the wireless devices to pair control channel candidate resources that share a same index when a signal linking certain CORESETS or search spaces is received. After configuring the wireless devices, the base station may transmit a signal indicating a correspondence between first CORESET 305-a and second CORESET 310-a. The first wireless device may receive the signal and determine first correspondence 335-a between first candidate resource 315-a and second candidate resource 325-a. The second wireless device may receive the signal and determine second correspondence 340-a between nth candidate resource 320-a and mth candidate resource 330-a.

In some cases, the base station may configure the wireless devices to pair a subset of control channel candidate resources that share a same index when a signal linking certain CORESETS or search spaces is received and may transmit a signal indicating a correspondence between first CORESET 305-a and second CORESET 310-a. In such cases, the first wireless device may receive the signal and determine first correspondence 335-a between first candidate resource 315-a and second candidate resource 325-a. And the second wireless device may receive the signal but refrain from determining a correspondence between nth candidate resource 320-a and mth candidate resource 330-a.

In some cases, the base station may explicitly signal to a wireless device that particular control channel candidate resources in particular CORESETS or search spaces are linked. For instance, the base station may signal that first candidate resource 315-a and second candidate resource 325-a are linked, and the wireless device may determine first correspondence 335-a between first candidate resource 315-a and second candidate resource 325-a.

In some cases, a correspondence between control channel candidate resources may be implicitly indicated. For instance, a first control message transmitted over first candidate resource 315-a may carry at least some of the same control information as a second control message transmitted over second candidate resource 325-a. In some cases, a wireless device may decode the first and second control messages and identify that all or certain fields of the control information carry the same information and may determine a correspondence between the first control message and the second control message. In another example, a wireless device may decode the first and second control messages before sending HARQ feedback for a HARQ process identifier and identify that a same HARQ process identifier is associated with both of the control messages. After identifying that the first and second control messages have the same HARQ process identifier, the wireless device may determine a correspondence between the first control message and the second control message.

Although the above is discussed in the context of determining a correspondence between two control channel candidate resources, the above principles may similarly be applied to link additional control channel candidate resources across CORESETS or search spaces. In some examples, a threshold number (e.g., <5) of control channel candidate resources may be linked.

Figure 3B:
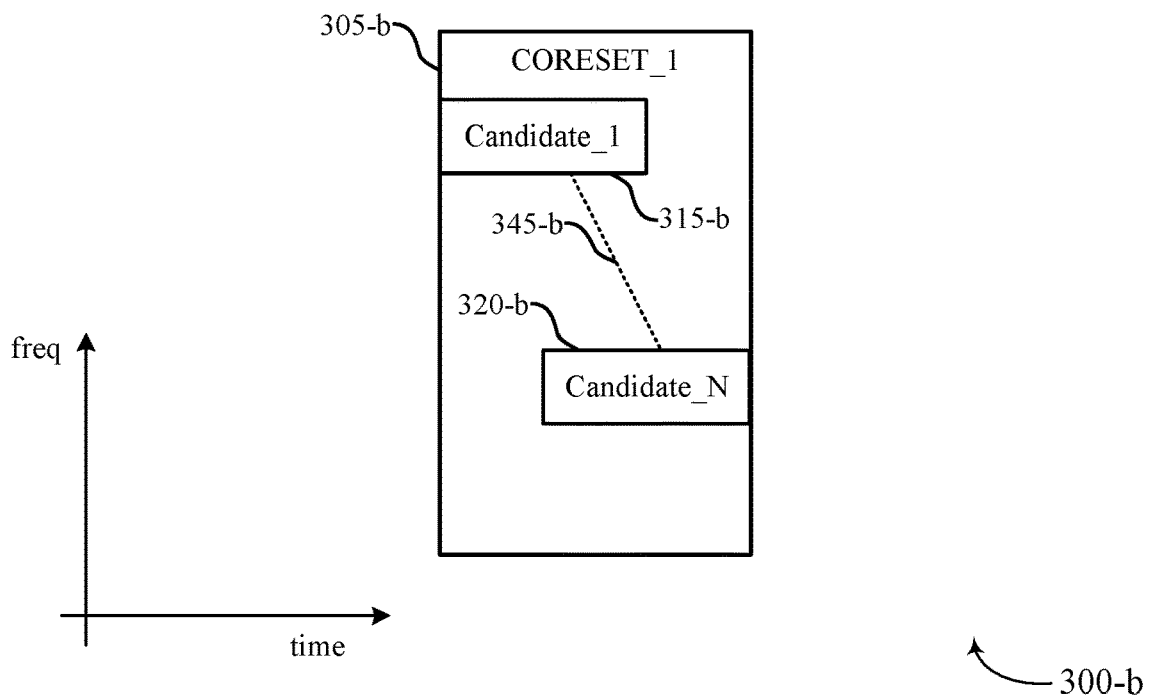

FIG. 3B illustrates an example of a control resource configuration that supports communication resource pairing and repetition in accordance with various aspects of the present disclosure. Control resource configuration 300-b may be an example configuration of control resources in a wireless system. Control resource configuration 300-b may include first CORESET 305-b, which may be similar to first CORESET 305-a or second CORESET 310-a of FIG. 3A. First CORESET 305-b may include first candidate resource 315-b and nth candidate resource 320-b, which may be similar to any of first candidate resource 315-a, second candidate resource 325-a, nth candidate resource 320-a, and mth candidate resource 330-a.

In some examples, certain control channel resource may be virtually linked within a CORESET or a search space. As discussed herein, candidate resources that are linked may be used to transmit repetitions of a control message for a single transport block. In some cases, a correspondence between control channel candidate resources may be explicitly indicated by a base station. For example, a base station may indicate (e.g., in RRC signaling) that a two or more control channel candidate resources in a CORESET or a search space are linked.

For example, a base station may transmit signaling indicating a correspondence between first candidate resource 315-b and nth candidate resource 320-b, as represented by third correspondence 345-b. In some cases, a correspondence between resources within a CORESET or a search space is maintained during additional CORESETS or search spaces.

In some cases, a correspondence between control channel candidate resources may be implicitly indicated. For instance, a first control message transmitted over first candidate resource 315-b may carry at least some of the same control information as a second control message transmitted over nth candidate resource 320-b. In some cases, a wireless device may decode the first and second control messages and identify that all or certain fields of the control information carry the same information and may determine a correspondence between the first control message and the second control message. In another example, a wireless device may decode the first and second control messages before sending HARQ feedback for a HARQ process identifier and identify that a same HARQ process identifier is associated with both of the control messages. After identifying that the first and second control messages have the same HARQ process identifier, the wireless device may determine a correspondence between the first control message and the second control message.

Although the above is discussed in the context of determining a correspondence between two control channel candidate resources, the above principles may similarly be applied to link additional control channel candidate resources within a CORESET or a search space. In some examples, a threshold number (e.g., <5) of control channel candidate resources may be linked.

Figure 4A:
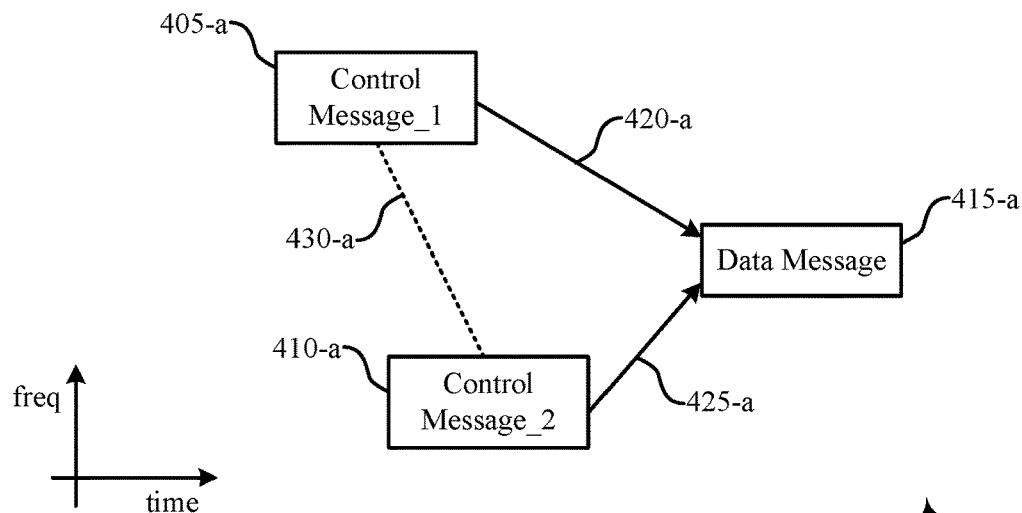
FIG. 4A to 4C illustrate examples of resource configurations that support communication resource pairing and repetition in accordance with various aspects of the present disclosure.

FIG. 4A illustrates an example of a resource configuration that supports communication resource pairing and repetition in accordance with various aspects of the present disclosure. Resource configuration 400-a may be an example configuration of control and data resources where multiple control messages may be used to aid in the reception and processing of a single data message. Resource configuration 400-a may include first control message 405-a, second control message 410-a, and data message 415-a.

First control message 405-a may be used to communicate control information for receiving and processing data message 415-a. For instance, first control message 405-a may include information that indicates a time and frequency location of data message 415-a, as represented by first arrow 420-a. In some cases, first control message 405-a may be received over different time and/or frequency resources than data message 415-a. For example, first control message 405-a may be located in a different time interval and/or a different carrier than data message 415-a. In some examples, first control message 405-a may be received over a control channel candidate resource, such as first candidate resource 315-a of FIG. 3A.

Second control message 410-a may similarly be used to communicate control information for receiving and processing data message 415-a. For instance, second control message 410-a may include information that indicates a time and frequency location of data message 415-a, as represented by second arrow 425-a. Second control message 410-a may be received over different time and/or frequency resources than data message 415-a. In some examples, second control message 410-a may be received over a control channel candidate resource, such as nth candidate resource 320-a of FIG. 3A.

Data message 415-a may be used to communicate user information. In some cases, data message 415-a occurs on different time and/or frequency resources than first control message 405-a and/or second control message 410-a. In some cases, first control message 405-a and second control message 410-a may both occur before data message 415-a in time. In some cases, first control message 405-a and second control message 410-a may be received within a same CORESET or search space.

In some cases, multiple control messages may be used to indicate information for locating and processing a data message. In some cases, the multiple control message may be transmitted over paired control channel candidate resources.

In an example for using two control messages for a single data message, a base station transmits first control message 405-a over a first control channel candidate resource, such as first candidate resource 315-a or 315-b of FIG. 3A or 3B, second control message 410-a over a second control channel candidate resource, such as nth candidate resource 320-a or 320-b of FIG. 3A or 3B, and data message 415-a over a first data resource to a wireless device. The first and second control channel candidate resources may be explicitly or implicitly linked as described herein, and similarly, first control message 405-a and second control message 410-a may be linked as represented by correspondence 430-a. In some cases, first control message 405-a contains control information (e.g., DCI) indicating a location of data message 415-a as indicated by first arrow 420-a and second control message 410-a contains control information (e.g., DCI) indicating a location of data message 415-a, as indicated by second arrow 425-a.

In some cases, first control message 405-a and second control message 410-a contain the same control information. In other cases, first control message 405-a and second control message 410-a contain different control information—e.g., second control message 410-a may have a different carrier indicator field (CIF) field value than first control message 405-a if second control message 410-a is transmitted over a different carrier than data message 415-a and first control message 405-a is transmitted over a same carrier as data message 415-a. When first control message 405-a and second control message 410-a contain the same control information, a wireless device that receives first control message 405-a and second control message 410-a may employ soft-combining techniques—e.g., the wireless device may decode the control information by jointly processing first control message 405-a and second control message 410-a.

In some cases, a wireless device receives and decodes one or both of first control message 405-a and second control message 410-a. After decoding first control message 405-a and second control message 410-a, the wireless device may identify a time and frequency location of data message 415-a (e.g., based on a resource allocation field) along with parameters for receiving data message 415-a (e.g., based on an MCS, communication rank, or a demodulation reference signal (DMRS) port). In some cases, the wireless device may refrain from decoding second control message 410-a if first control message 405-a is successfully decoded, or vice versa. In some cases, the wireless device determines that an error has occurred if certain control information between first control message 405-a and second control message 410-a is different—e.g., if a resource allocation, a modulation and coding scheme, a rank, a demodulation reference signal port, or a redundancy version are different.

After receiving the parameters for decoding data message 415-a, the wireless device may decode data message 415-a accordingly. After decoding data message 415-a, the wireless device may generate and transmit HARQ feedback for data message 415-a. For instance, if data message 415-a is successfully decoded, the wireless device may transmit an acknowledgement (ACK). Otherwise, the wireless device may send a negative acknowledgement (NACK).

Although the above is discussed in the context of determining a correspondence between two control messages, the above principles may similarly be applied to link additional control messages. In some examples, a threshold number (e.g., <5) of control messages may be linked.

Figure 4B:
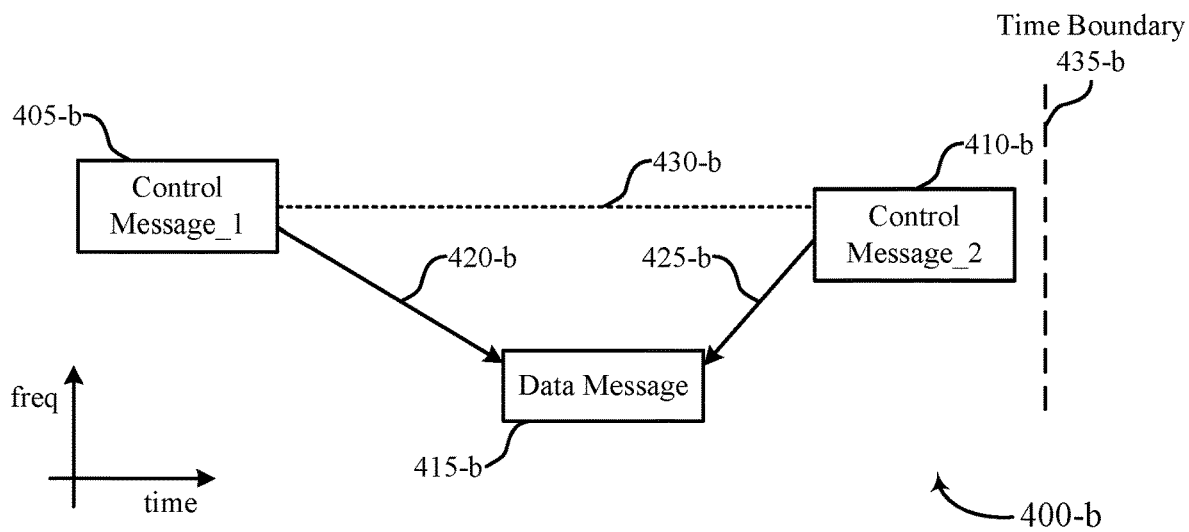

FIG. 4B illustrates an example of a resource configuration that supports communication resource pairing and repetition in accordance with various aspects of the present disclosure. Resource configuration 400-b may be an example configuration of control and data resources where multiple control messages may be used to aid in the reception and processing of a single data message. Resource configuration 400-b may include first control message 405-b, second control message 410-b, data message 415-b, which may be similar to first control message 405-a, second control message 410-a, and data message 415-a of FIG. 4A. Resource configuration may also include time boundary 435-b (which may be a slot boundary).

First control message 405-b may indicate a time and frequency location of data message 415-b as represented by first arrow 420-b and second control message 410-b may indicate a time and frequency location of data message 415-b as represented by second arrow 425-b. In some cases, first control message 405-b may occur before data message 415-b and second control message 410-b may occur after data message 415-b in time. In some cases, first control message 405-b and second control message 410-b may be received across different CORESETs or search spaces. In some other cases, first control message 405-b and second control message 410-b may be received across the same CORESET or search space. In some cases, second control message 410-b is received in a same slot as data message 415-b, as indicated by time boundary 435-b.

In some cases, multiple control messages may be used to indicate information for locating and processing a data message. In some cases, the multiple control message may be transmitted over paired control channel candidate resources.

In an example for using two control messages for a single data message, a base station transmits first control message 405-b over a first control channel candidate resource, such as first candidate resource 315-a of FIG. 3A, second control message 410-b over a second control channel candidate resource, such as second candidate resource 325-a of FIG. 3A, and data message 415-b over a first data resource to a wireless device. The first and second control channel candidate resources may be explicitly or implicitly linked as described herein, and similarly, first control message 405-b and second control message 410-b may be linked as represented by correspondence 430-b. In some cases, first control message 405-b contains control information (e.g., DCI) indicating a location of data message 415-b as indicated by first arrow 420-b and second control message 410-b contains control information (e.g., DCI) indicating a location of data message 415-b, as indicated by second arrow 425-b.

In some cases, first control message 405-b and second control message 410-b contain the same control information. In other cases, first control message 405-b and second control message 410-b contain different control information—e.g., second control message 410-b may have a different delay indicator value (or $K_0$) than first control message 405-b if second control message 410-b is transmitted over a different time slot/mini-slot than data message 415-b and first control message 405-b is transmitted over a same time slot/mini-slot as data message 415-b. When first control message 405-b and second control message 410-b contain the same control information, a wireless device that receives first control message 405-b and second control message 410-b may employ soft-combining techniques.

In some cases, a wireless device receives and decodes one or both of first control message 405-b and second control message 410-b. After decoding first control message 405-b and second control message 410-b, the wireless device may identify a time and frequency location of data message 415-b (e.g., based on a resource allocation field) along with parameters for receiving data message 415-b (e.g., based on an MCS, communication rank, or a DMRS port). After the decoding, the wireless device may also determine that both first control message 405-b and second control message 410-b schedule the same data message 415-b. In some cases, the wireless device may refrain from decoding second control message 410-b if first control message 405-b is successfully decoded, or vice versa. In some cases, the wireless device determines that an error has occurred if certain control information between first control message 405-b and second control message 410-b is different—e.g., if a resource allocation, a modulation and coding scheme, a rank, a demodulation reference signal port, or a redundancy version are different.

After receiving the parameters for decoding data message 415-b, the wireless device may decode data message 415-b accordingly. After decoding data message 415-b, the wireless device may generate and transmit HARQ feedback for data message 415-b. For instance, if data message 415-b is successfully decoded, the wireless device may transmit an ACK. Otherwise, the wireless device may send a NACK.

Although the above is discussed in the context of determining a correspondence between two control messages, the above principles may similarly be applied to link additional control messages. In some examples, a threshold number (e.g., <5) of control messages may be linked.

Figure 4C:
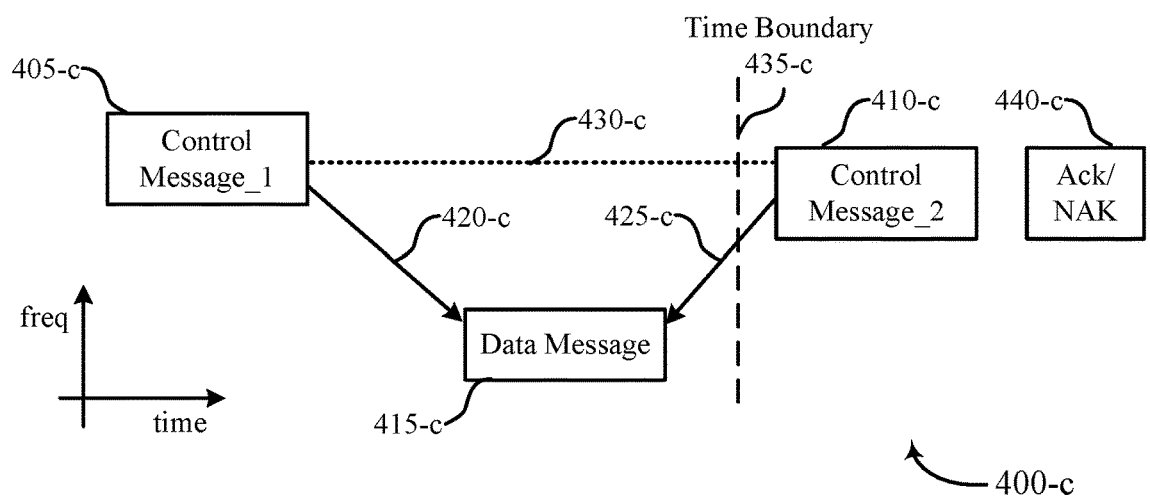

FIG. 4C illustrates an example of a resource configuration that supports communication resource pairing and repetition in accordance with various aspects of the present disclosure. Resource configuration 400-c may be an example configuration of control and data resources where multiple control messages may be used to aid in the reception and processing of a single data message. Resource configuration 400-c may include first control message 405-c, second control message 410-c, data message 415-c, which may be similar to first control message 405-a or 405-b, second control message 410-a or 410-b, and data message 415-a or 415-b of FIGS. 4A and 4B. Resource configuration may also include time boundary 435-c and HARQ feedback resource 440-c.

First control message 405-c may indicate a time and frequency location of data message 415-c as represented by first arrow 420-c and second control message 410-c may indicate a time and frequency location of data message 415-c as represented by second arrow 425-c. In some cases, first control message 405-c may occur before data message 415-c and second control message 410-c may occur after data message 415-c in time. In some cases, first control message 405-c and second control message 410-c may be received across different CORESETS or search spaces. In some cases, first control message 405-c and second control message 410-c may be received across the same CORESET or search space. In some cases, second control message 410-c is received in a different time slot/mini-slot (e.g., a subsequent time slot/mini-slot) as data message 415-c, as indicated by time boundary 435-c.

HARQ feedback resource 440-c may be used by a wireless device to communicate HARQ feedback to a base station. In some cases, a location of HARQ feedback resource 440-c is determined relative to the later of first control message 405-c, second control message 410-c, and data message 415-c. In some examples, HARQ feedback resource 440-a is offset from the later of first control message 405-c, second control message 410-c, and data message 415-c by a value kl included in the control message. In some cases, HARQ feedback resource 440-c is located in a different time interval than second control message 410-c.

In some cases, multiple control messages may be used to indicate information for locating and processing a data message. In some cases, the multiple message may be transmitted over paired control channel candidate resources.

In an example for using two control messages for a single data message, a base station transmits first control message 405-c over a first control channel candidate resource, such as first candidate resource 315-a of FIG. 3A, second control message 410-c over a second control channel candidate resource, such as second candidate resource 325-a of FIG. 3A, and data message 415-b to a wireless device. The first and second control channel candidate resources may be explicitly or implicitly linked as described herein, and similarly, first control message 405-c and second control message 410-c may be linked as represented by correspondence 430-c. In some cases, first control message 405-c contains control information (e.g., DCI) indicating a location of data message 415-c as indicated by first arrow 420-c and second control message 410-c contains control information (e.g., DCI) indicating a location of data message 415-c, as indicated by second arrow 425-b.

In some cases, first control message 405-b and second control message 410-b contain different control information—e.g., second control message 410-b may have a different delay indicator value (or $K_0$) than first control message 405-b if second control message 410-b is transmitted over a different time interval than data message 415-b and first control message 405-b is transmitted over a same time interval as data message 415-b. Second control message 410-c may contain different control information than first control message 405-c based on being located in a different time slot/mini-slot N+1 than data message 415-c, which may be located in time slot/mini-slot N. In order to indicate a location of data message 415-c, second control message 410-c may include a negative value in a delay indicator field. A delay indicator field may be used to indicate an offset of a data message from a control message in terms of a number of slots and may include a value $K_0$ to indicate the offset. A negative value in the delay indicator field may indicate that the data message occurred before the control message, and may also be referred to as a cross-slot back reference. A value of the delay indicator field for second control message 410-c may be equal to −1 to indicate that data message 415-c is located in a prior slot. In some cases, the wireless device may buffer previously received signals to enable such operation. In some cases, data message 415-c is located in a same slot as first control message 405-c, and a value of the delay indicator field for first control message 405-c may be equal to 0 to indicate that data message 415-c is located in the same slot.

In some cases, a wireless device receives and decodes one or both of first control message 405-c and second control message 410-c. After decoding first control message 405-c and second control message 410-c, the wireless device may identify a time and frequency location of data message 415-c (e.g., based on a resource allocation field) along with parameters for receiving data message 415-c (e.g., based on an MCS, communication rank, or a DMRS port). After the decoding, the wireless device may also determine that both first control message 405-c and second control message 410-c schedule the same data message 415-c. In some cases, the wireless device may refrain from decoding second control message 410-c if first control message 405-c is successfully decoded, or vice versa. In some cases, the wireless device determines that an error has occurred if certain control information between first control message 405-c and second control message 410-c is different—e.g., if a resource allocation, a modulation and coding scheme, a rank, a demodulation reference signal port, or a redundancy version are different.

After receiving the parameters for decoding data message 415-c, the wireless device may decode data message 415-c accordingly. After decoding data message 415-c, the wireless device may generate and transmit HARQ feedback for data message 415-c. For instance, if data message 415-c is successfully decoded, the wireless device may transmit an ACK. Otherwise, the wireless device may send a NACK.

In some cases, the wireless device may transmit HARQ feedback (e.g., an ACK or NAK) to the base station during HARQ feedback resource 440-c based on the decoding of the data message. In some examples, a location of HARQ feedback resource 440-c is determined relative to second control message 410-c—e.g., since second control message occurs after data message 415-c. In some examples, first control message 405-c may include a slot offset kl equal to one time slot/mini-slot. The wireless device may identify that second control message 410-c occurs after data message 415-c and may determine that HARQ feedback resource 440-c occurs one time slot/mini-slot after second control message 410-c. In some cases, the wireless device may determine that second control message 410-c occurs after data message 415-c even when second control message is not decoded based on knowing the correspondence 430-c between first control message 405-c and second control message 410-c. Similarly, a minimum HARQ processing time (N1) for the wireless device to generate HARQ feedback may be measured from the latest of first control message 405-c, second control message 410-c, and data message 415-c. For example, the minimum HARQ processing time may be measured with respect to the end of the last OFDM symbol of second control message 410-c.

Although the above is discussed in the context of determining a correspondence between two control messages, the above principles may similarly be applied to link additional control messages. In some examples, a threshold number (e.g., <5) of control messages may be linked.

Figure 5A:
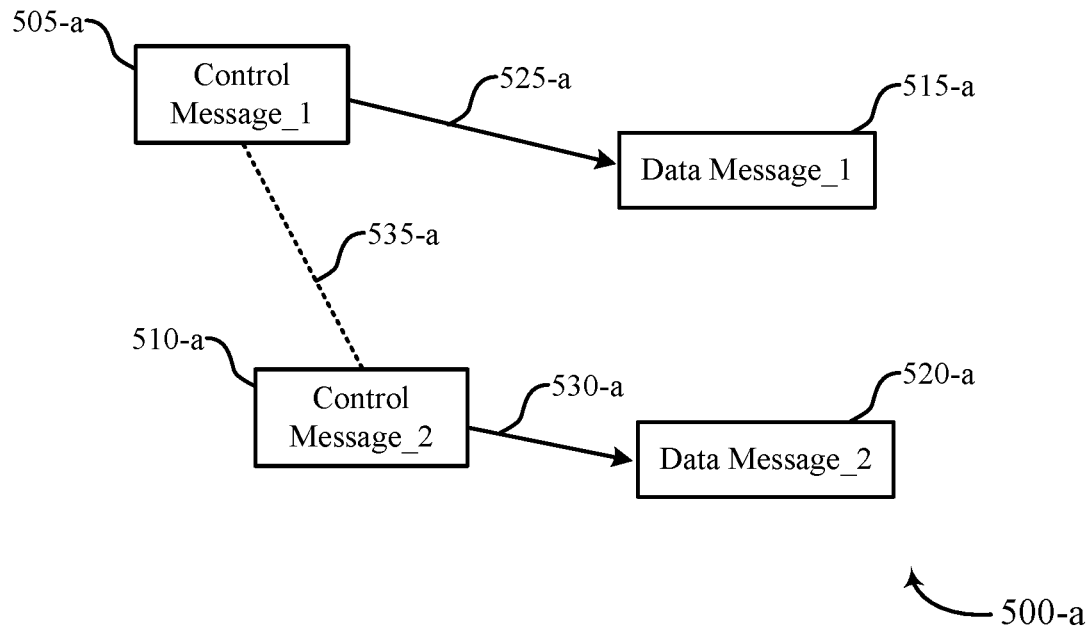
FIGS. 5A and 5B illustrate examples of resource configurations that support communication resource pairing and repetition in accordance with various aspects of the present disclosure.

FIG. 5A illustrates an example of a resource configuration that supports communication resource pairing and repetition in accordance with various aspects of the present disclosure. Resource configuration 500-a may be an example configuration of control and data resources where multiple control messages may be used to aid in the reception and processing of multiple data messages. Resource configuration 500-a may include first control message 505-a, second control message 510-a, first data message 515-a, and second data message 520-a.

First control message 505-a may indicate a time and frequency location of first data message 515-a, as represented by first arrow 525-a. Second control message 510-a may indicate a time and frequency location of second data message 520-a, as represented by second arrow 530-b. In some cases, first data message 515-a and second data message 520-a contain the same transport block.

In some cases, multiple control messages may be used to indicate information for locating and processing multiple data message conveying information for a single transport block. In some cases, the multiple control message may be transmitted over paired control channel candidate resources.

In an example of the above, a base station transmits first control message 505-a over a first control channel candidate resource, such as first candidate resource 315-a or 315-b of FIG. 3A or 3B, and second control message 510-a over a second control channel candidate resource, such as nth candidate resource 320-a or 320-b of FIG. 3A or 3B, first data message 515-a over a first data resource, and second data message 520-a over a second data resource to a wireless device. The first and second control channel candidate resources may be explicitly or implicitly linked as described herein, and similarly, first control message 505-a and second control message 510-a may be linked as represented by first correspondence 535-a. In some cases, first control message 505-a contains control information (e.g., DCI) indicating a location of first data message 515-*a* as indicated by first arrow 525-*a* and second control message 510-*a* contains control information (e.g., DCI) indicating a location of second data message 520-*a*, as indicated by second arrow 530-*a*. First control message 505-*a* may contain different control information than second control message 510-*a*, while first data message 515-*a* may contain the same user information as second data message 520-*a*.

In some cases, a wireless device receives and decodes one or both of first control message 505-*a* and second control message 510-*a*. If the wireless device decodes only first control message 505-*a*, the wireless device may identify a location of only first data message 515-*a*. Similarly, if the wireless device decodes only second control message 510-*a*, the wireless device may identify a location of only second data message 520-*a*. In some cases, the wireless device determines that an error has occurred if certain control information between first control message 505-*a* and second control message 510-*a* is different—e.g., if a resource allocation, a modulation and coding scheme, a rank, a demodulation reference signal port, or a redundancy version are different.

After decoding one or both of first control message 505-*a* and second control message 510-*a*, the wireless device may receive and decode one or both of first data message 515-*a* and second data message 520-*a*. In some cases, the wireless device performs soft-combining of first data message 515-*a* and second data message 520-*a*. In some cases, whether the wireless device performs soft-combining is based on whether the wireless device is capable of soft-combining. In some cases, the wireless device fails to decode first data message 515-*a* but successfully decodes second data message 520-*a*. In such a case, the wireless device may still receive the transmitted transport block since both first data message 515-*a* and second data message 520-*a* may contain the same transport block.

After decoding first data message 515-*a* and second data message 520-*a*, the wireless device may report HARQ feedback for first data message 515-*a* and second data message 520-*a*. If soft-combining is used, the wireless device may maintain a joint HARQ buffer for first data message 515-*a* and second data message 520-*a*. In such a case, the wireless device may transmit a single ACK/NACK for both first data message 515-*a* and second data message 520-*a* to the base station. And the base station may move on to a subsequent transport block if an ACK is received. Otherwise, the base station may retransmit the transport block over a subsequent pair of data messages. If soft-combining is not used, the wireless device may maintain separate HARQ buffers for first data message 515-*a* and second data message 520-*a*. In such a case, the wireless device may transmit a first ACK/NACK for first data message 515-*a* and a second ACK/NACK for second data message 520-*a* to the base station. And the base station may move on to a subsequent transport block if either a first ACK or a second ACK is received. Otherwise, the base station may retransmit the transport block over a subsequent pair of data messages.

Although the above is discussed in the context of determining a correspondence between two control and data messages, the above principles may similarly be applied to link additional control and data messages. In some examples, a threshold number (e.g., <5) of control messages may be linked.

Figure 5B:
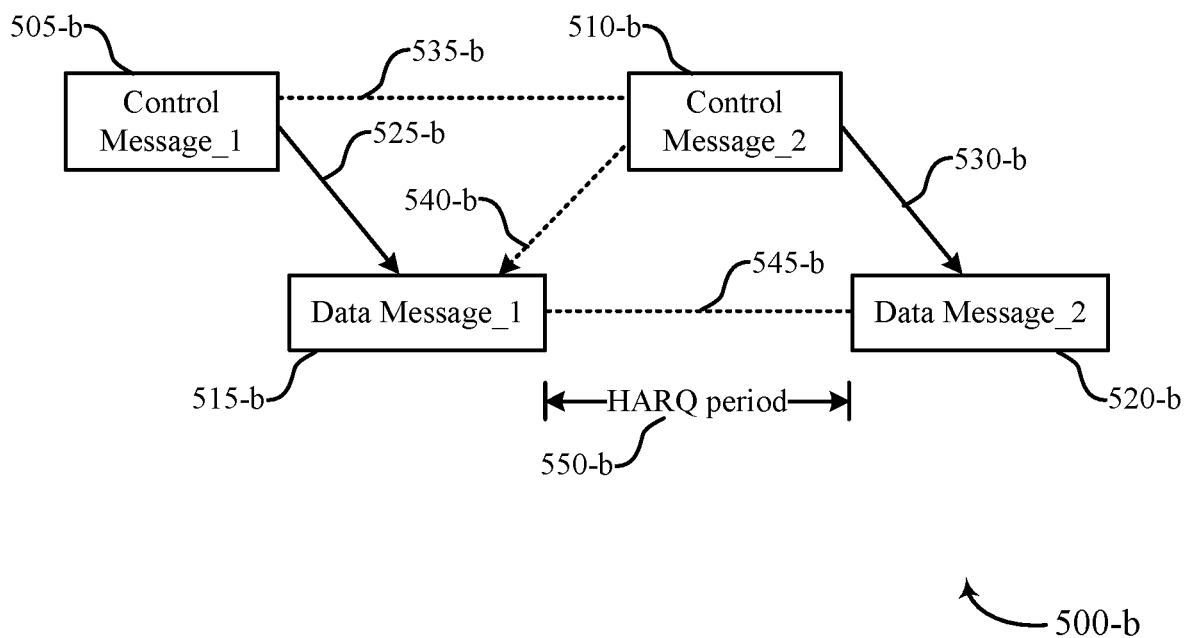

FIG. 5B illustrates an example of a resource configuration that supports communication resource pairing and repetition in accordance with various aspects of the present disclosure.

Resource configuration 500-*b* may be an example configuration of control and data resources where multiple control messages may be used to aid in the reception and processing of multiple data messages. Resource configuration 500-*b* may include first control message 505-*b*, second control message 510-*b*, first data message 515-*b*, and second data message 520-*b*.

In some cases, first control message 505-*b* and first data message 515-*b* may be associated with a first HARQ transmission (e.g., a new data transmission) of a HARQ process and second control message 510-*b* and second data message 520-*b* may be associated with a second HARQ transmission (e.g., a first retransmission) of the HARQ process. In some cases, retransmissions of data during a HARQ process are separated by HARQ period 550-*b*.

In some cases, multiple control messages may be used to indicate information for locating and processing multiple data message conveying information for a single transport block. In some cases, the multiple control message may be transmitted over paired control channel candidate resources.

In an example of the above, a base station transmits first control message 505-*b* over a first control channel candidate resource, such as first candidate resource 315-*a* of FIG. 3A, second control message 510-*b* over a second control channel candidate resource, such as second candidate resource or 325-*a* of FIG. 3A, first data message 515-*a* over a first data resource, and second data message 520-*a* over a second data resource to a wireless device. The first and second control channel candidate resources may be explicitly or implicitly linked as described herein, and similarly, first control message 505-*b* and second control message 510-*a* may be linked as represented by first correspondence 535-*b*. In some cases, first control message 505-*b* contains control information (e.g., DCI) indicating a location of first data message 515-*b* as indicated by first arrow 525-*b* and second control message 510-*b* contains control information (e.g., DCI) indicating a location of second data message 520-*b*, as indicated by second arrow 530-*b*. First control message 505-*b* may contain different control information than second control message 510-*b*, while first data message 515-*b* may contain the same user information as second data message 520-*b*—e.g., first data message 515-*b* and second data message 520-*b* may convey the same transport block.

In some cases, the base station transmits first control message 505-*b* and first data message 515-*b* as a first transmission of a HARQ process. And subsequently transmits second control message 510-*b* and second data message 520-*b* as a retransmission of the first transmission for the HARQ process. In some cases, the base station subsequently transmits second control message 510-*b* and second data message 520-*b* based on the wireless device failing to decode either of first control message 505-*b* or first data message 515-*b*.

In some cases, the wireless device may decode second control message 510-*b* and determine that the previous transmission of first data message 515-*b* has occurred. The wireless device may then determine a second correspondence 545-*b* between first data message 515-*b* and second data message 520-*b*. The second control message 510-*b* may also indicate a time and frequency location of first data message 515-*b*, as represented by third arrow 540-*b*, as well as information for receiving first data message 515-*b*. In some cases, the location of first data message 515-*b* is determined based on the location of second data message 520-*b* and known HARQ period 550-*b* and the parameters for receiving first data message 515-*b* are the same as those conveyed in second control message 510-*b*. In some cases, the wireless device identifies the prior transmission of first control message 505-*b* and first data message 515-*b* based on a counter included in control information of second control message 510-*b* that indicates a number of transmissions that have occurred for a transport block. In some cases, the wireless device may buffer previously received signals to enable such operation. In some cases, the wireless device determines that an error has occurred if certain control information between first control message 505-*b* and second control message 510-*b* is different—e.g., if a resource allocation, a modulation and coding scheme, a rank, a demodulation reference signal port, or a redundancy version are different.

After identifying first data message 515-*b*, the wireless device may soft-combine first data message 515-*b* and second data message 520-*b*. If soft-combining is used, the wireless device may maintain a joint HARQ buffer for first data message 515-*a* and second data message 520-*a*. In such a case, the wireless device may transmit a single ACK/NACK for both first data message 515-*a* and second data message 520-*a* to the base station. And the base station may move on to a subsequent transport block if an ACK is received.

Although the above is discussed in the context of determining a correspondence between two control and data messages across two HARQ transmissions, the above principles may similarly be applied to link additional control and data messages across multiple HARQ transmissions. In some examples, a threshold number (e.g., <5) of control messages may be linked.

Figure 6A:
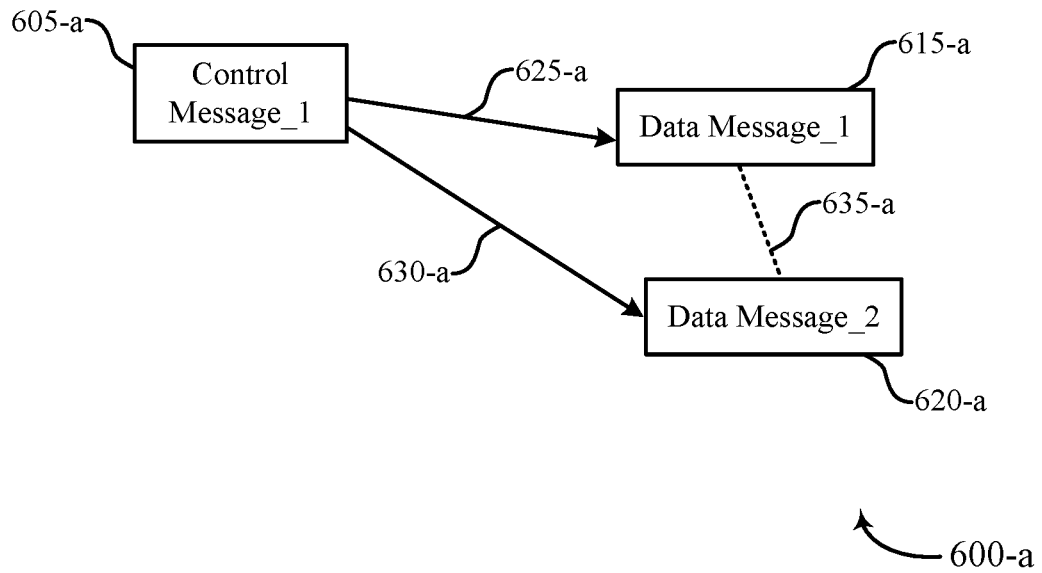
FIGS. 6A and 6B illustrates an example of resource configurations that support communication resource pairing and repetition in accordance with various aspects of the present disclosure.

FIG. 6A illustrates an example of a resource configuration that supports communication resource pairing and repetition in accordance with various aspects of the present disclosure. Resource configuration 600-*a* may be an example configuration of control and data resources where multiple control messages may be used to aid in the reception and processing of multiple data messages. Resource configuration 600-*a* may include first control message 605-*a*, first data message 615-*a*, and second data message 620-*a*.

First control message 605-*a* may be used to convey information for receiving and processing first data message 615-*a* and second data message 620-*a*. In some examples, first control message 605-*a*, first data message 615-*a*, and second data message 620-*a* may be located on different time and/or frequency resources (e.g., in different time intervals, on different carriers, transmitted from different TRPs, and the like). In some examples, first data message 615-*a* and second data message 620-*a* may include the same or different transport blocks. In some examples, first control message 605-*a* may include two resource allocation fields, a first resource allocation field indicating a time and frequency location of first data message 615-*a*, as represented by first arrow 625-*a*, and a second resource allocation field indicating a time and frequency location of second data message 620-*a*, as represented by second arrow 630-*a*.

In one example, a base station may transmit first control message 605-*a* over a first control channel candidate resource. The base station may also transmit first data message 615-*a* over a first data resource and second data message 620-*a* over a second data resource. In some cases, first control message 605-*a* may include a first resource allocation field indicating a time and frequency location of first data message 615-*a* and a second resource allocation field indicating a time and frequency location of second data message 620-*a*. First control message 605-*a* may also include parameters for receiving first data message 615-*a* and second data message 620-*a*. In some cases, the parameters are the same for both first data message 615-*a* and second data message 620-*a*. In some cases, first data message 615-*a* and second data message 620-*a* contain a same transport block. In other cases, first data message 615-*a* and second data message 620-*a* contain a different transport block.

A wireless device may identify and decode first data message 615-*a* and second data message 620-*a* based on decoding first control message 605-*a*. In some cases, wireless device may determine that there is a correspondence 635-*a* between first data message 615-*a* and second data message 620-*a* based on identifying both resource allocation fields in first control message 605-*a*. In some cases, the wireless device successfully decodes one or both of first data message 615-*a* and second data message 620-*a*.

After decoding first data message 615-*a* and second data message 620-*a* may report HARQ feedback. If first data message 615-*a* and second data message 620-*a* contain the same transport block and soft-combining is configured at the wireless device, then the wireless device may soft-combine first data message 615-*a* and second data message 620-*a*. When soft-combining is used, the wireless device may transmit joint HARQ feedback for first data message 615-*a* and second data message 620-*a*. Otherwise if first data message 615-*a* and second data message 620-*a* contain a different transport block or soft-combining is not enabled at the wireless device, the wireless device may transmit bundled HARQ feedback for first data message 615-*a* and second data message 620-*a* in one uplink transmission.

Figure 6B:
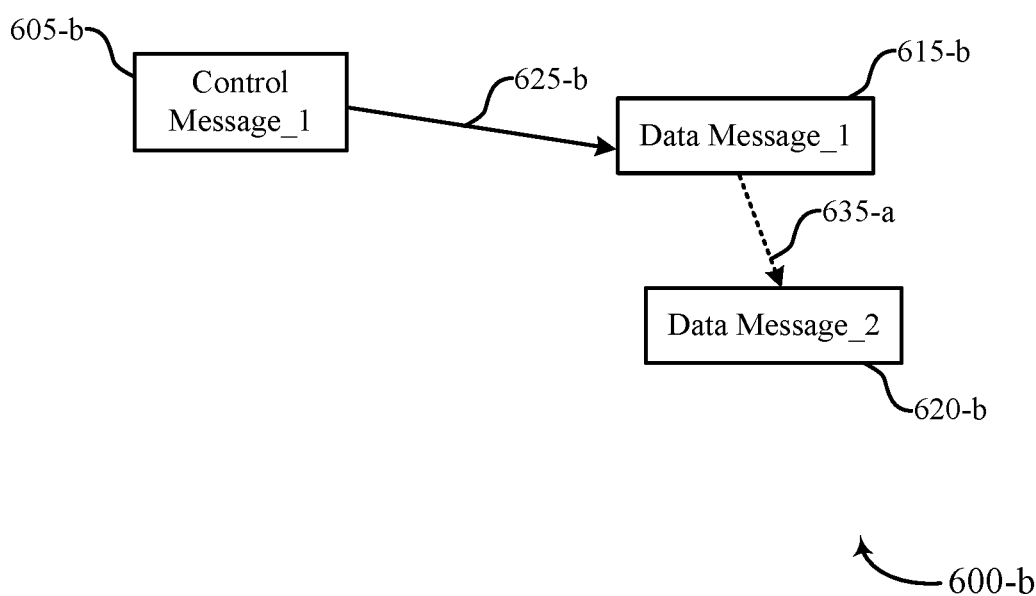

FIG. 6B illustrates an example of a resource configuration that supports communication resource pairing and repetition in accordance with various aspects of the present disclosure. Resource configuration 600-*b* may be an example configuration of control and data resources where multiple control messages may be used to aid in the reception and processing of multiple data messages. Resource configuration 600-*b* may include first control message 605-*b*, first data message 615-*b*, and second data message 620-*b*.

First control message 605-*b* may be used to convey information for receiving and processing first data message 615-*b* and second data message 620-*b*. In some examples, first control message 605-*b*, first data message 615-*b*, and second data message 620-*b* may be located on different time and/or frequency resources (e.g., in different time intervals, on different carriers, transmitted from different TRPs, and the like). In some examples, first data message 615-*b* and second data message 620-*b* may include the same or different transport blocks. In some examples, first control message 605-*b* may include one resource allocation field indicating a time and frequency location of first data message 615-*b*, as represented by first arrow 625-*b*.

In one example, a base station may transmit first control message 605-*b* over a first control channel candidate resource. The base station may also transmit first data message 615-*b* over a first data resource and second data message 620-*b* over a second data resource. The base station may also transmit signaling indicating a correspondence 635-*b* between a first data resource, used by first data message 615-*b*, and a second data resource, used by second data message 620-*b*. In some cases, first control message 605-*b* may include a first resource allocation field indicating a time and frequency location of first data message 615-*b*, along with parameters for receiving first data message 615-*b* and second data message 620-*b*. In some cases, first data message 615-*b* and second data message 620-*b* contain a same transport block. In other cases, first data message 615-*b* and second data message 620-*b* contain a different transport block.

A wireless device may identify and decode first data message 615-*b* based on decoding first control message 605-*b*. In some cases, the wireless device may identify second data resources used by second data message 620-*b* based on the correspondence 635-*b*. Thus, the wireless device may also decode second data message 620-*b*. In some cases, the wireless device successfully decodes one or both of first data message 615-*b* and second data message 620-*b*.

After decoding first data message 615-*b* and second data message 620-*b* may report HARQ feedback. If first data message 615-*b* and second data message 620-*b* contain the same transport block and soft-combining is configured at the wireless device, then the wireless device may soft-combine first data message 615-*b* and second data message 620-*b*. When soft-combining is used, the wireless device may transmit joint HARQ feedback for first data message 615-*b* and second data message 620-*b*. Otherwise if first data message 615-*b* and second data message 620-*b* contain a different transport block or soft-combining is not enabled at the wireless device, the wireless device may transmit bundled or multiplexed HARQ feedback for first data message 615-*b* and second data message 620-*b* in one uplink transmission.

Figure 7:
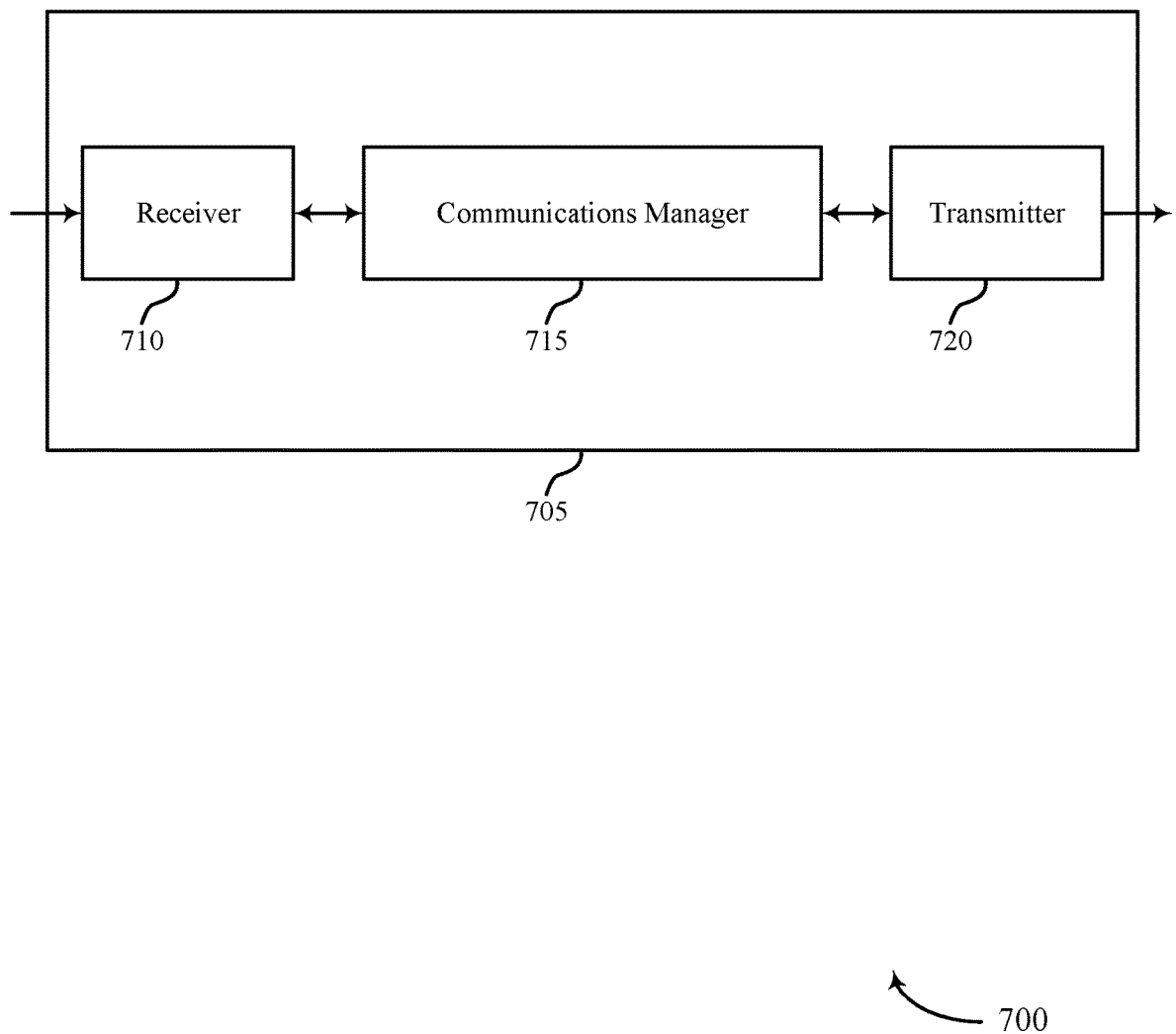
FIGS. 7 and 8 show block diagrams of devices that support communication resource pairing and repetition in accordance with aspects of the present disclosure.

FIG. 7 shows a block diagram 700 of a device 705 that supports communication resource pairing and repetition in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to communication resource pairing and repetition, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a signal indicating a correspondence between a first control channel candidate resource and a second control channel candidate resource, monitor the first control channel candidate resource and the second control channel candidate resource, decode at least one of a first control message received over the first control channel candidate resource or a second control message received over the second control channel candidate resource based on the monitoring, where the first control message and the second control message indicate at least one data resource, and receive a data message over the at least one data resource, where the data message conveys information for a single transport block.

The communications manager 715 may also monitor a first control channel candidate resource and a second control channel candidate resource in a set of control channel resources, decode, based on the monitoring, a first control message in the first control channel candidate resource and a second control message in the second control channel candidate resource, where the first control message and the second control message indicate at least one data resource, determine, based on the decoding, a correspondence between the first control channel candidate resource and the second control channel candidate resource, and receive a data message over the at least one data resource, where the data message conveys information for a single transport block.

The communications manager 715 may also decode a control message in a first control channel candidate resource, identify, based on the decoding, a first data resource and a second data resource, where a first data message is received over the first data resource and a second data message is received over the second data resource, determine a correspondence between the first data resource and the second data resource based on decoding the control message, and decode, based on the determining, the first data message received over the first data resource and the second data message received over the second data resource. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
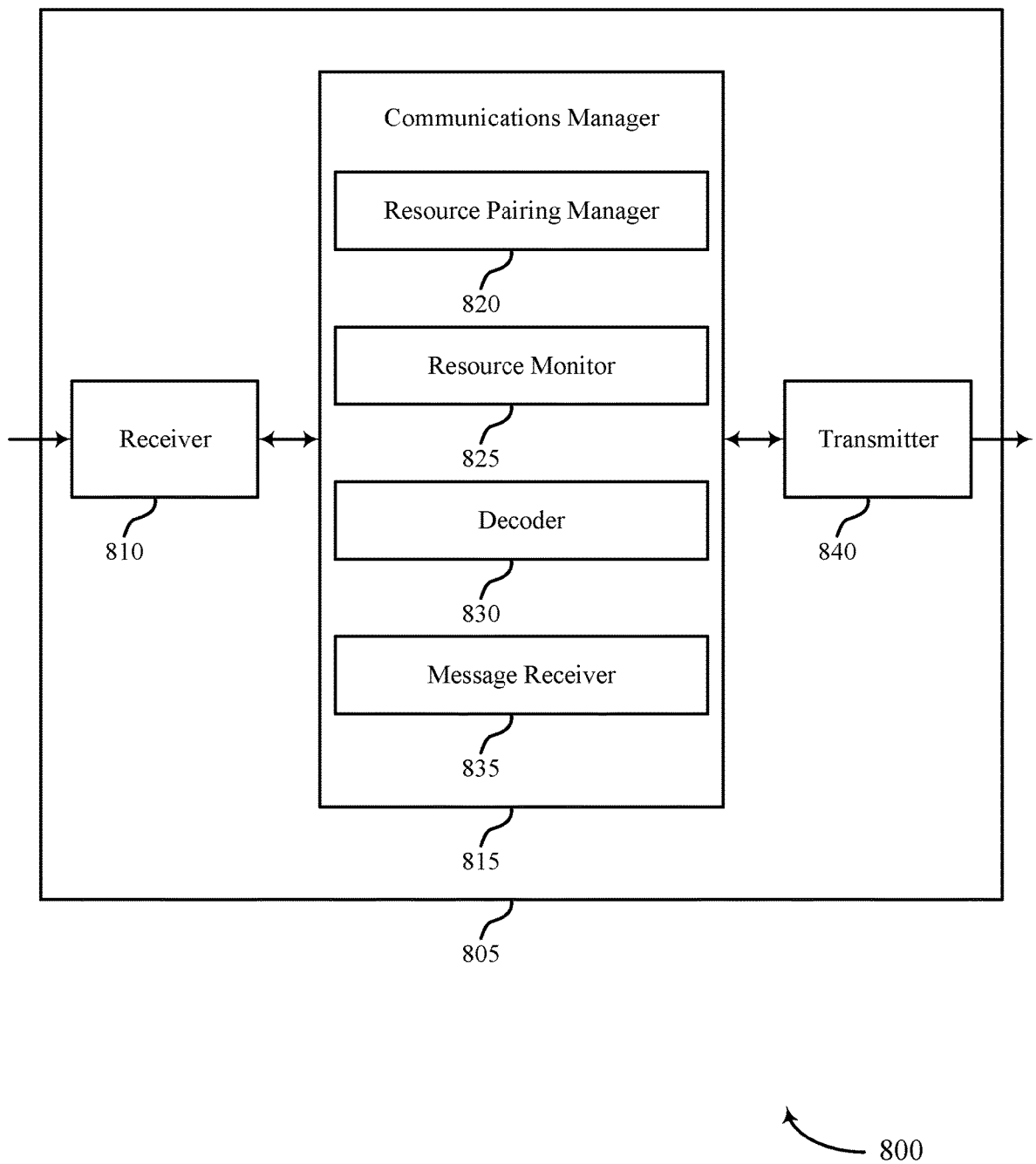

FIG. 8 shows a block diagram 800 of a device 805 that supports communication resource pairing and repetition in accordance with aspects of the present disclosure. The device 805 may be an example of aspects of a device 705 or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to communication resource pairing and repetition, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a resource pairing manager 820, a resource monitor 825, a decoder 830, and a message receiver 835. The communications manager 815 may be an example of aspects of the communications manager 1010 described herein.

In some examples, the resource pairing manager 820 may receive a signal indicating a correspondence between a first control channel candidate resource and a second control channel candidate resource. The resource monitor 825 may monitor the first control channel candidate resource and the second control channel candidate resource. The decoder 830 may decode at least one of a first control message received over the first control channel candidate resource or a second control message received over the second control channel candidate resource based on the monitoring, where the first control message and the second control message indicate at least one data resource. The message receiver 835 may receive a data message over the at least one data resource, where the data message conveys information for a single transport block.

In some examples, the resource monitor 825 may monitor a first control channel candidate resource and a second control channel candidate resource in a set of control channel resources. The decoder 830 may decode, based on the monitoring, a first control message in the first control channel candidate resource and a second control message in the second control channel candidate resource, where the first control message and the second control message indicate at least one data resource. The resource pairing manager 820 may determine, based on the decoding, a correspondence between the first control channel candidate resource and the second control channel candidate resource. The message receiver 835 may receive a data message over the at least one data resource, where the data message conveys information for a single transport block.

In some examples, the message receiver 835 may decode a control message in a first control channel candidate resource. The resource monitor 825 may identify, based on the decoding, a first data resource and a second data resource, where a first data message is received over the first data resource and a second data message is received over the second data resource. The resource pairing manager 820 may determine a correspondence between the first data resource and the second data resource based on decoding the control message. The decoder 830 may decode, based on the determining, the first data message received over the first data resource and the second data message received over the second data resource.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
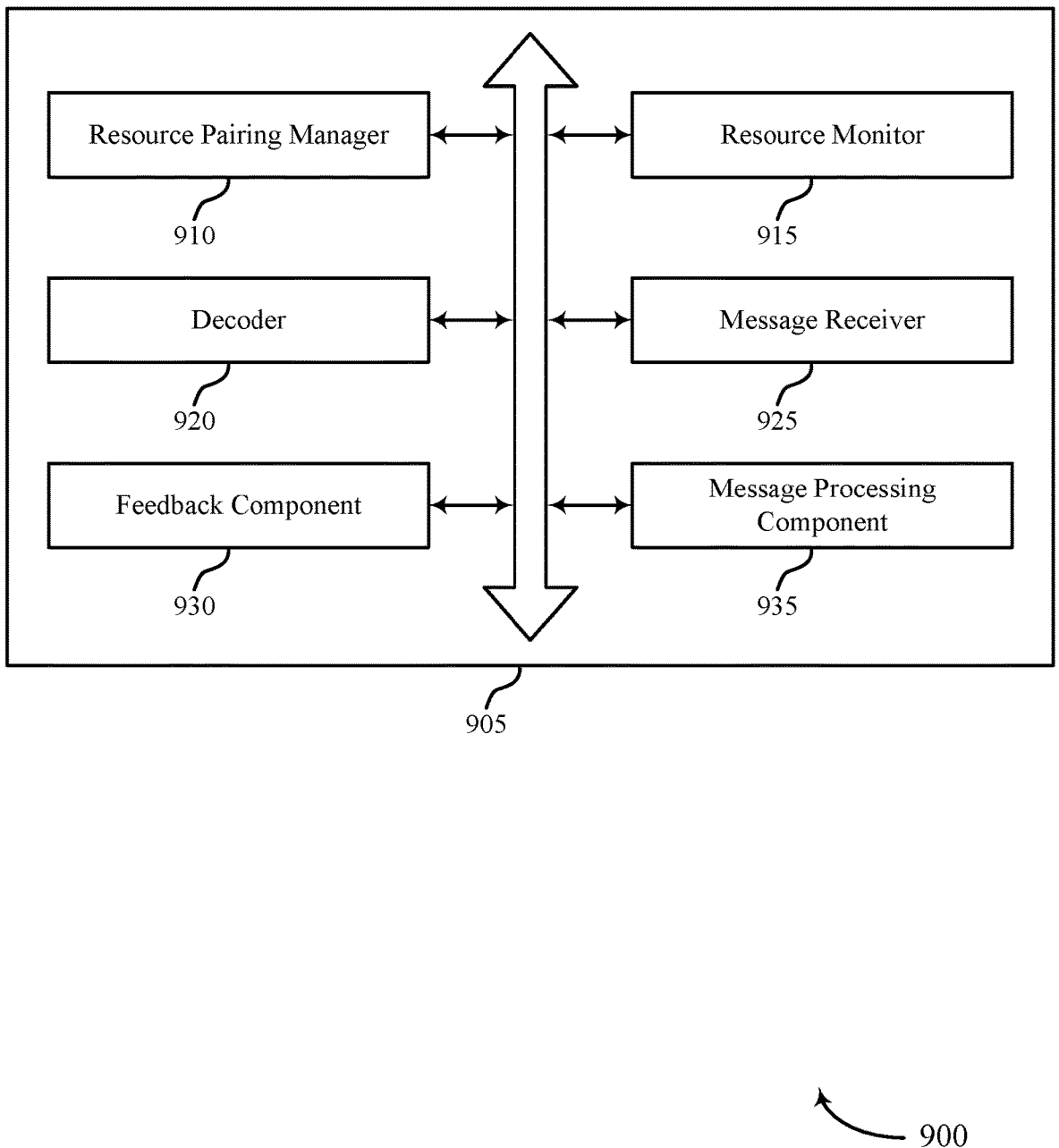
FIG. 9 shows a block diagram of a communications manager that supports communication resource pairing and repetition in accordance with aspects of the present disclosure.

FIG. 9 shows a block diagram 900 of a communications manager 905 that supports communication resource pairing and repetition in accordance with aspects of the present disclosure. The communications manager 905 may be an example of aspects of a communications manager 715, a communications manager 815, or a communications manager 1010 described herein. The communications manager 905 may include a resource pairing manager 910, a resource monitor 915, a decoder 920, a message receiver 925, a feedback component 930, and a message processing component 935. Each of these modules may communicate, directly or indirectly, with one another (e.g., via one or more buses).

The resource pairing manager 910 may receive a signal indicating a correspondence between a first control channel candidate resource and a second control channel candidate resource. In some examples, the resource pairing manager 910 may determine, based on the decoding, a correspondence between the first control channel candidate resource and the second control channel candidate resource. In some examples, the resource pairing manager 910 may determine a correspondence between the first data resource and the second data resource based on decoding the control message.

In some examples, the resource pairing manager 910 may determine the correspondence between the first control channel candidate resource and the second control channel candidate resource based on the second signal. In some examples, the resource pairing manager 910 may determine a correspondence between the first control message and the second control message based on the receiving. In some examples, the resource pairing manager 910 may receive a signal indicating the correspondence between the first data resource and the second data resource.

In some cases, the first control channel candidate resource is associated with a first index of the first set of control channel resources and the second control channel candidate resource is associated with a second index of the second set of control channel resources, where a value of the first index and a value of the second index being the same, and where the signal indicates the value of the first index and the second index. In some cases, the correspondence is determined based on decoding the first control message and the second control message before the HARQ feedback.

The resource monitor 915 may monitor the first control channel candidate resource and the second control channel candidate resource. In some examples, the resource monitor 915 may monitor a first control channel candidate resource and a second control channel candidate resource in a set of control channel resources. In some examples, the resource monitor 915 may identify, based on the decoding, a first data resource and a second data resource, where a first data message is received over the first data resource and a second data message is received over the second data resource.

In some examples, the resource monitor 915 may monitor the first control channel candidate resource and the second control channel candidate resource in a first set of control channel resources of the set of control channel resources; or both. In some examples, the resource monitor 915 may monitor the first control channel candidate resource in the first set of control channel resources of the set of control channel resources and the second control channel candidate resource in a second set of control channel resources of the set of control channel resources. In some examples, the resource monitor 915 may identify a location of the first data resource based on the first resource allocation field and a location of the second data resource based on the second resource allocation field. In some examples, the resource monitor 915 may identify a location of the first data resource based on the first resource allocation field. In some examples, the resource monitor 915 may identify a location of the second data resource based on receiving the signal and the location of the first data resource.

In some cases, the first set of control channel resources is associated with a first time and a first frequency bandwidth and the second set of control channel resources is associated with a second time and a second frequency bandwidth.

The decoder 920 may decode at least one of a first control message received over the first control channel candidate resource or a second control message received over the second control channel candidate resource based on the monitoring, where the first control message and the second control message indicate at least one data resource. In some examples, the decoder 920 may decode, based on the monitoring, a first control message in the first control channel candidate resource and a second control message in the second control channel candidate resource, where the first control message and the second control message indicate at least one data resource. In some examples, the decoder 920 may decode, based on the determining, the first data message received over the first data resource and the second data message received over the second data resource.

In some examples, the decoder 920 may soft-combine the first control message and the second control message. In some examples, the decoder 920 may decode the data message based on the first control information or the second control information, or both. In some examples, the decoder 920 may refrain from decoding the data message based on the determining. In some examples, the decoder 920 may decode the first data message or the second data message based on receiving the signal, or both. In some examples, the decoder 920 may decode the second control message received over the second control channel candidate resource, where the second control message indicates the first data resource and the second data resource based on the first HARQ process and in part on the correspondence. In some examples, the decoder 920 may soft-combine the first data message and the second data message. In some examples, the decoder 920 may decode the first control message. In some examples, the decoder 920 may refrain from decoding the second control message based on successfully decoding the first control message and the determining. In some cases, the decoding includes soft-combining the first data message and the second data message. In some cases, the first control message and the second control message are decoded before HARQ feedback associated with the first HARQ process identifier is transmitted.

The message receiver 925 may receive a data message over the at least one data resource, where the data message conveys information for a single transport block. In some examples, the message receiver 925 may receive a data message over the at least one data resource, where the data message conveys information for a single transport block. In some examples, the message receiver 925 may decode a control message in a first control channel candidate resource.

In some examples, the message receiver 925 may receive the first control message over the first control channel candidate resource in the first set of control channel resources and the second control message over the second control channel candidate resource in the second set of control channel resources. In some examples, the message receiver 925 may receive the first control message and the second control message over the set of control channel resources. In some examples, the message receiver 925 may receive the first control message over a first frequency bandwidth and the second control message over a second frequency bandwidth, where the first control message and the second control message indicate a location of the first data resource in the second frequency bandwidth.

In some examples, the message receiver 925 may receive the first control message during a first time interval and the second control message during a second time interval, the second time interval occurring after the first time interval, where the first control message and the second control message indicate a location of the first data resource in a third time interval. In some examples, the message receiver 925 may receive the data message during the third time interval. In some examples, the message receiver 925 may identify a fourth time interval based on receiving the second control message during the second time interval and receiving the data message during the third time interval, where the fourth time interval occurs after the second time interval and the third time interval and is offset from a later of the second time interval and the third time interval. In some examples, the message receiver 925 may identify a fourth time interval based on receiving the second control message during the second time interval after receiving the data message during the third time interval, where the fourth time interval occurs after and is offset from the second time interval. In some cases, the third time interval occurs after the first time interval and the second time interval. In some cases, the third time interval is equivalent to the first time interval, and both the first time interval and the third time interval are before the second time interval. In some cases, the third time interval is equivalent to the second time interval. In some cases, the third time interval occurs after the first time interval and before the second time interval.

In some examples, the message receiver 925 may buffer a second signal received during the first data resource before receiving the second data message, the second signal corresponding to the first data message. In some examples, the message receiver 925 may identify the first data message based on the second data message and the first HARQ process. In some cases, the first control message and the second control message indicate a first data resource. In some cases, a first starting symbol of the first control message or a second starting symbol of the second control message, or both, occur before a third starting symbol of the first data resource.

In some cases, the first control message includes first control information and the second control message includes second control information, the first control information and the second control information being different. In some cases, a carrier indicator field of the first control message is different than a carrier indicator field of the second control message. In some cases, the first control message indicates a first data resource and the second control message indicates a second data resource. In some cases, the first control message and the second control message indicate a first data resource. In some cases, the first control message indicates a first data resource and the second control message indicates a second data resource. In some cases, the first control message is associated with a first HARQ process identifier and the second control message is associated with the first HARQ process identifier. In some cases, the first data message and the second data message convey information for a single transport block.

The feedback component 930 may report HARQ feedback during the fourth time interval. In some examples, the feedback component 930 may maintain a joint HARQ buffer for the first data message and the second data message based on the soft-combining. In some examples, the feedback component 930 may maintain a first HARQ buffer for the first data message and a second HARQ buffer for the second data message. In some examples, the feedback component 930 may report HARQ feedback for the first data message and the second data message in a single uplink transmission. In some cases, the offset is based on a time location of the third time interval and a processing time for HARQ feedback. The feedback component 930 may identify an earliest starting symbol of a HARQ feedback resource based at least in part on a HARQ processing period and a latest of a first ending symbol of the first control message, a second ending symbol of the second control message, or a third ending symbol of the data message.

The feedback component 930 may identify a HARQ feedback resource based at least in part on a HARQ reporting offset and latest of a first ending symbol of the first control message, a second ending symbol of the second control message, or a third ending symbol of the data message. The feedback component 930 may identify a fourth time interval based at least in part on receiving the second control message during the second time interval after receiving the data message during the third time interval, where the fourth time interval occurs after and is offset from the second time interval and report HARQ feedback during the fourth time interval The message processing component 935 may compare the first control information and the second control information. In some examples, the message processing component 935 may determine that a parameter of the first control information is different than the parameter of the second control information, the parameter being associated with the data message. In some cases, the parameter includes any one of a resource allocation, a modulation and coding scheme, a rank, a demodulation reference signal port, or a redundancy version. In some examples, the message processing component 935 may identify that the first control information and the second control information are the same, where determining the correspondence is based on the identifying. In some examples, the message processing component 935 may determine that the first data message and the second data message convey the information for the single transport block based on determining the correspondence.

In some examples, the message processing component 935 identifies that the control message includes a first resource allocation field corresponding to the first data resource and a second resource allocation field corresponding to the second data resource, where the correspondence between the first data resource and the second data resource is based on the identifying. In some cases, a delay indicator field indicates that the first data resource occurs before the second time interval. In some cases, a delay indicator field of the first control message is different than a delay indicator field of the second control message.

Figure 10:
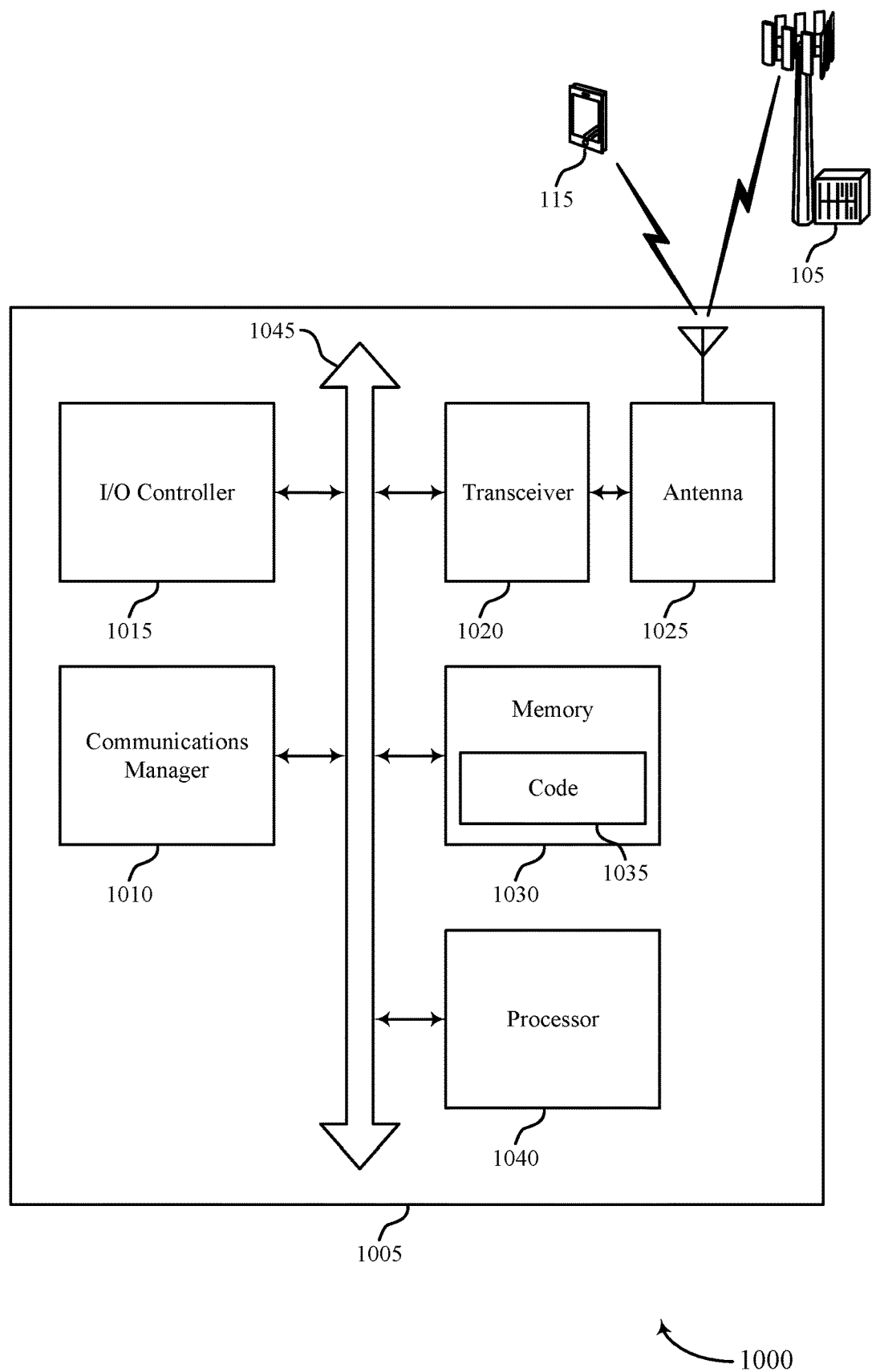
FIG. 10 shows a diagram of a system including a device that supports communication resource pairing and repetition in accordance with aspects of the present disclosure.

FIG. 10 shows a diagram of a system 1000 including a device 1005 that supports communication resource pairing and repetition in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a signal indicating a correspondence between a first control channel candidate resource and a second control channel candidate resource, monitor the first control channel candidate resource and the second control channel candidate resource, decode at least one of a first control message received over the first control channel candidate resource or a second control message received over the second control channel candidate resource based on the monitoring, where the first control message and the second control message indicate at least one data resource, and receive a data message over the at least one data resource, where the data message conveys information for a single transport block. The communications manager 1010 may also monitor a first control channel candidate resource and a second control channel candidate resource in a set of control channel resources, decode, based on the monitoring, a first control message in the first control channel candidate resource and a second control message in the second control channel candidate resource, where the first control message and the second control message indicate at least one data resource, determine, based on the decoding, a correspondence between the first control channel candidate resource and the second control channel candidate resource, and receive a data message over the at least one data resource, where the data message conveys information for a single transport block. The communications manager 1010 may also decode a control message in a first control channel candidate resource, identify, based on the decoding, a first data resource and a second data resource, where a first data message is received over the first data resource and a second data message is received over the second data resource, determine a correspondence between the first data resource and the second data resource based on decoding the control message, and decode, based on the determining, the first data message received over the first data resource and the second data message received over the second data resource.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting communication resource pairing and repetition).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
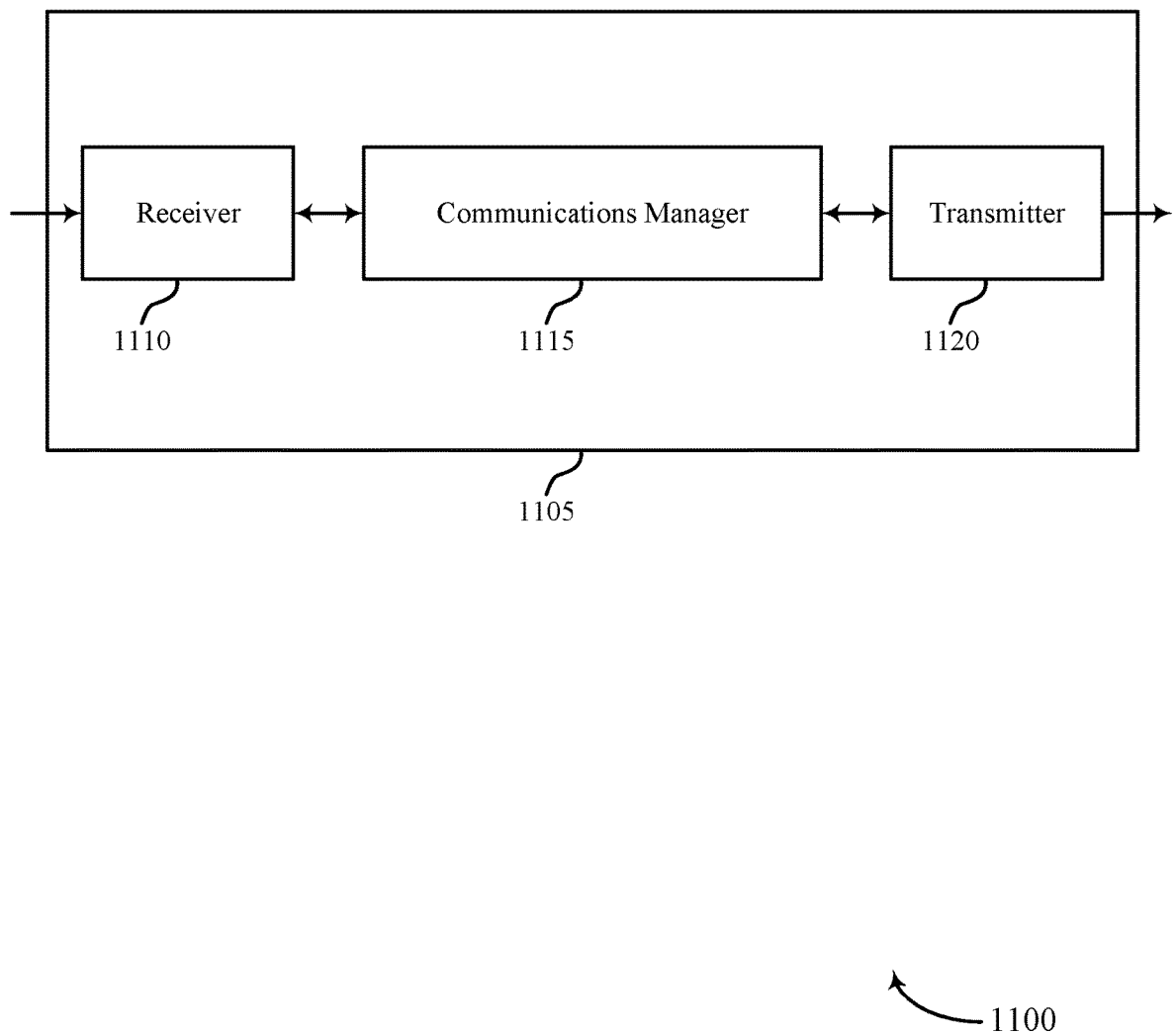
FIGS. 11 and 12 show block diagrams of devices that support communication resource pairing and repetition in accordance with aspects of the present disclosure.

FIG. 11 shows a block diagram 1100 of a device 1105 that supports communication resource pairing and repetition in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to communication resource pairing and repetition, etc.). Information may be passed on to other components of the device 1105. The receiver 1110 may be an example of aspects of the transceiver 1420 described with reference to FIG. 14. The receiver 1110 may utilize a single antenna or a set of antennas.

In some examples, the communications manager 1115 may determine a correspondence between a first control channel candidate resource and a second control channel candidate resource, transmit a first control message over the first control channel candidate resource and a second control message over the second control channel candidate resource in a set of control channel resources, where the first control message and the second control message indicate at least one data resource, and transmit a data message over the at least one data resource, where the data message conveys information for a single transport block.

In some examples, the communications manager 1115 may also determine a correspondence between a first data resource and a second data resource, transmit a first control message over a first control candidate channel resource, where the first control message indicates a location of the first data resource or the second data resource, or both, and transmit a first data message over the first data resource and a second data message over the second data resource. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
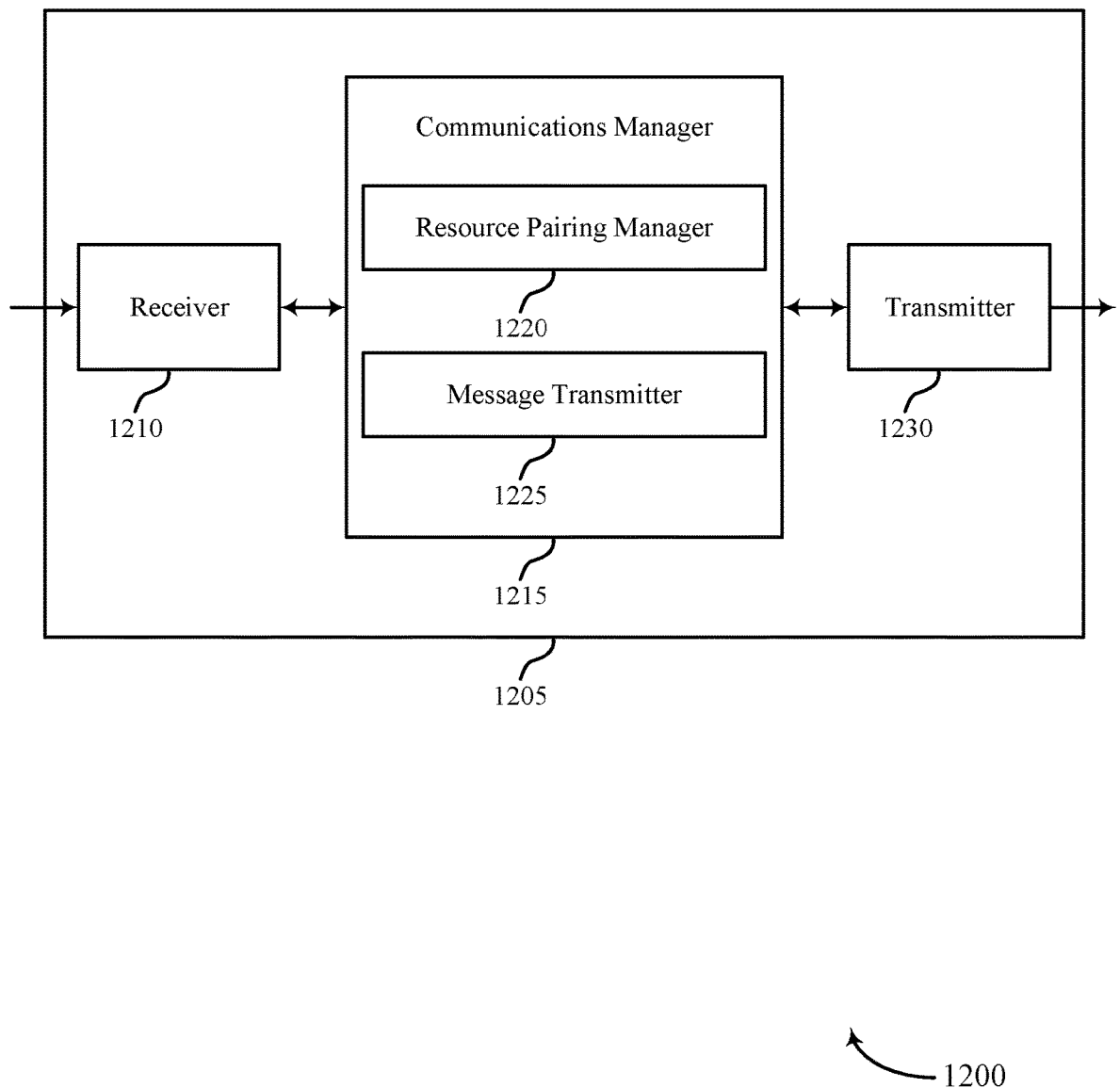

FIG. 12 shows a block diagram 1200 of a device 1205 that supports communication resource pairing and repetition in accordance with aspects of the present disclosure. The device 1205 may be an example of aspects of a device 1105 or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to communication resource pairing and repetition, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a resource pairing manager 1220 and a message transmitter 1225. The communications manager 1215 may be an example of aspects of the communications manager 1410 described herein.

In some examples, the resource pairing manager 1220 may determine a correspondence between a first control channel candidate resource and a second control channel candidate resource. The message transmitter 1225 may transmit a first control message over the first control channel candidate resource and a second control message over the second control channel candidate resource in a set of control channel resources, where the first control message and the second control message indicate at least one data resource. The message transmitter 1225 may also transmit a data message over the at least one data resource, where the data message conveys information for a single transport block.

In some examples, the resource pairing manager 1220 may determine a correspondence between a first data resource and a second data resource. The message transmitter 1225 may transmit a first control message over a first control candidate channel resource, where the first control message indicates a location of the first data resource or the second data resource, or both. The message transmitter 1225 may also transmit a first data message over the first data resource and a second data message over the second data resource.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
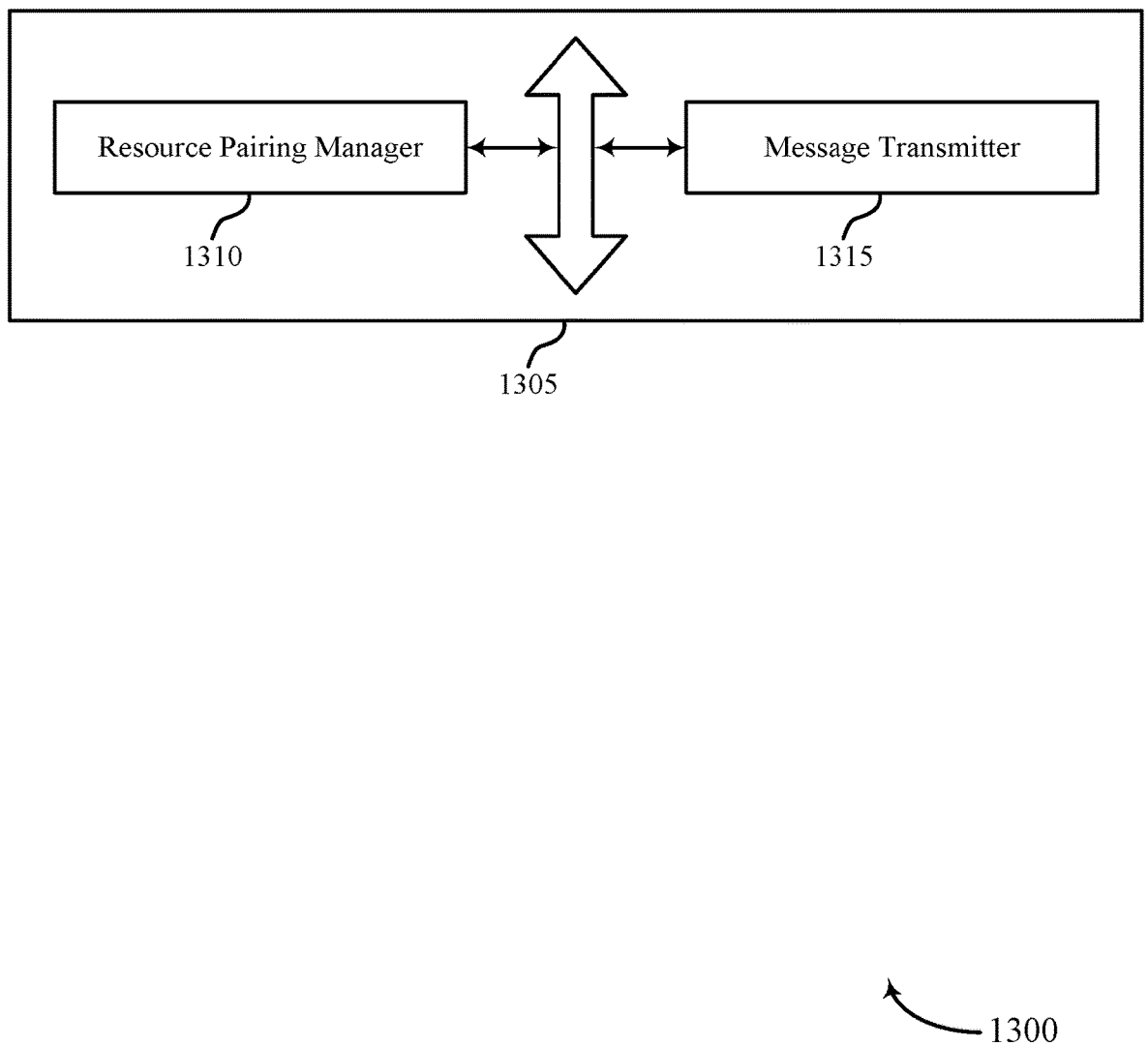
FIG. 13 shows a block diagram of a communications manager that supports communication resource pairing and repetition in accordance with aspects of the present disclosure.

FIG. 13 shows a block diagram 1300 of a communications manager 1305 that supports communication resource pairing and repetition in accordance with aspects of the present disclosure. The communications manager 1305 may be an example of aspects of a communications manager 1115, a communications manager 1215, or a communications manager 1410 described herein. The communications manager 1305 may include a resource pairing manager 1310 and a message transmitter 1315. Each of these modules may communicate, directly or indirectly, with one another (e.g., via one or more buses).

The resource pairing manager 1310 may determine a correspondence between a first control channel candidate resource and a second control channel candidate resource. In some examples, the resource pairing manager 1310 may transmit a signal indicating the correspondence between the first control channel candidate resource and the second control channel candidate resource. In some cases, the first control channel candidate resource and the second control channel candidate resource are in a first set of control channel resources of the set of control channel resources. In some cases, the first control channel candidate resource is in the first set of control channel resources of the set of control channel resources and the second control channel candidate resource is in a second set of control channel resources of the set of control channel resources.

In some examples, the resource pairing manager 1310 may determine a correspondence between a first data resource and a second data resource. In some examples, the resource pairing manager 1310 may transmit a signal indicating the correspondence between the first data resource and the second data resource, where a location of the second data resource is based on the location of the first data resource and the signal.

The message transmitter 1315 may transmit a first control message over the first control channel candidate resource and a second control message over the second control channel candidate resource, where the first control message and the second control message indicate at least one data resource. In some cases, the first control message includes first control information and the second control message includes second control information, the first control information and the second control information being the same. In some examples, the message transmitter 1315 may transmit a first control message over a first control candidate channel resource, where the first control message indicates a location of the first data resource or the second data resource, or both. In some cases, the first control message includes a first resource allocation field indicating a location of the first data resource and a second allocation field indicating a location of the second data resource.

In some examples, the message transmitter 1315 may transmit a data message over the at least one data resource, where the data message conveys information for a single transport block. In some examples, the message transmitter 1315 may transmit a first data message over the first data resource and a second data message over the second data resource. In some examples, the message transmitter 1315 may transmit a first data message conveying information for the single transport block over the first data resource. In some examples, the message transmitter 1315 may transmit a first data message conveying information for the single transport block over the first data resource and a second data message conveying information for the single transport block over the second data resource. In some cases, the first data message and the second data message convey information for a single transport block.

Figure 14:
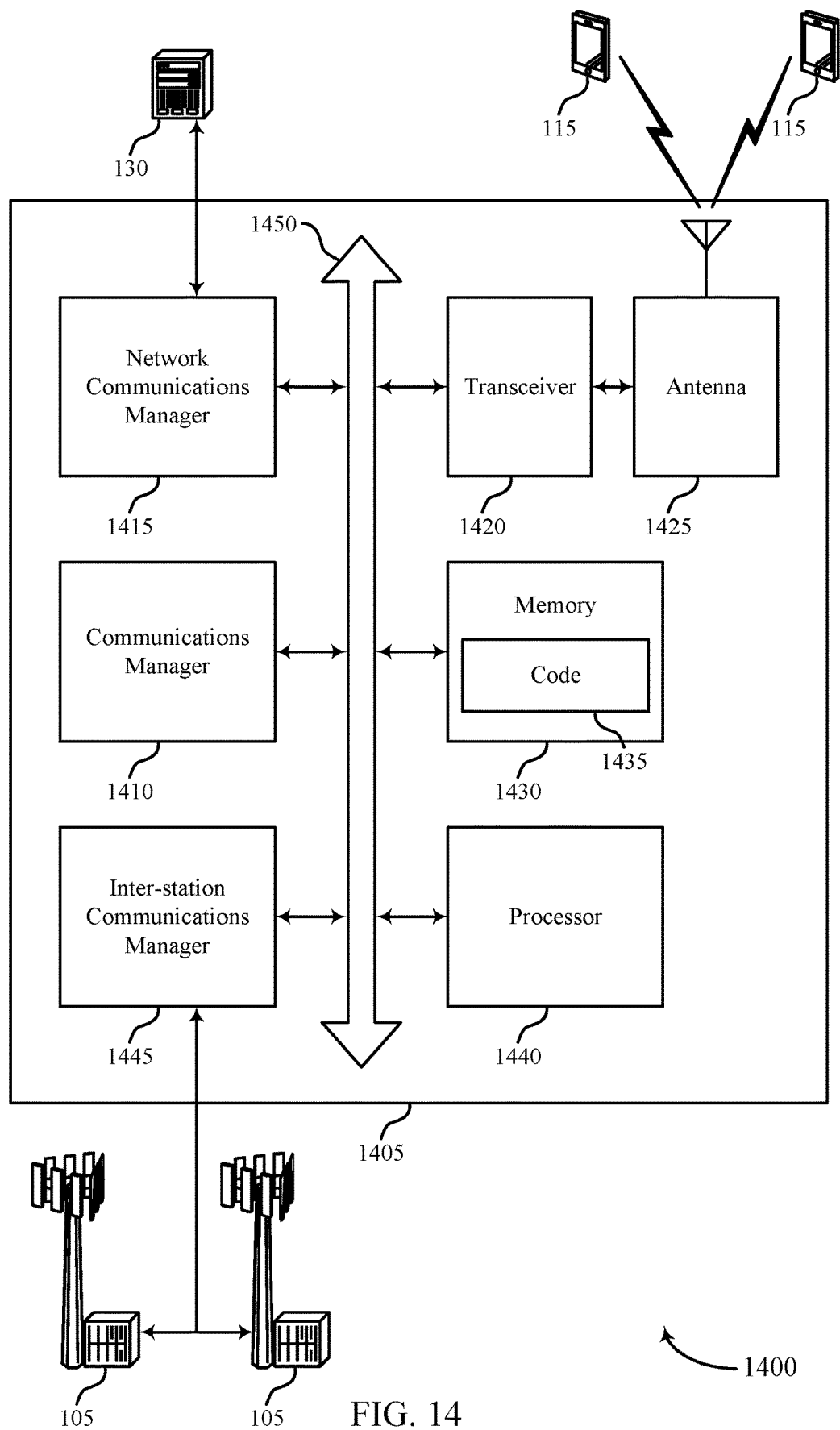
FIG. 14 shows a diagram of a system including a device that supports communication resource pairing and repetition in accordance with aspects of the present disclosure.

FIG. 14 shows a diagram of a system 1400 including a device 1405 that supports communication resource pairing and repetition in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine a correspondence between a first control channel candidate resource and a second control channel candidate resource, transmit a first control message over the first control channel candidate resource and a second control message over the second control channel candidate resource in a set of control channel resources, where the first control message and the second control message indicate at least one data resource, and transmit a data message over the at least one data resource, where the data message conveys information for a single transport block. The communications manager 1410 may also determine a correspondence between a first data resource and a second data resource, transmit a first control message over a first control candidate channel resource, where the first control message indicates a location of the first data resource or the second data resource, or both, and transmit a first data message over the first data resource and a second data message over the second data resource.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting communication resource pairing and repetition).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
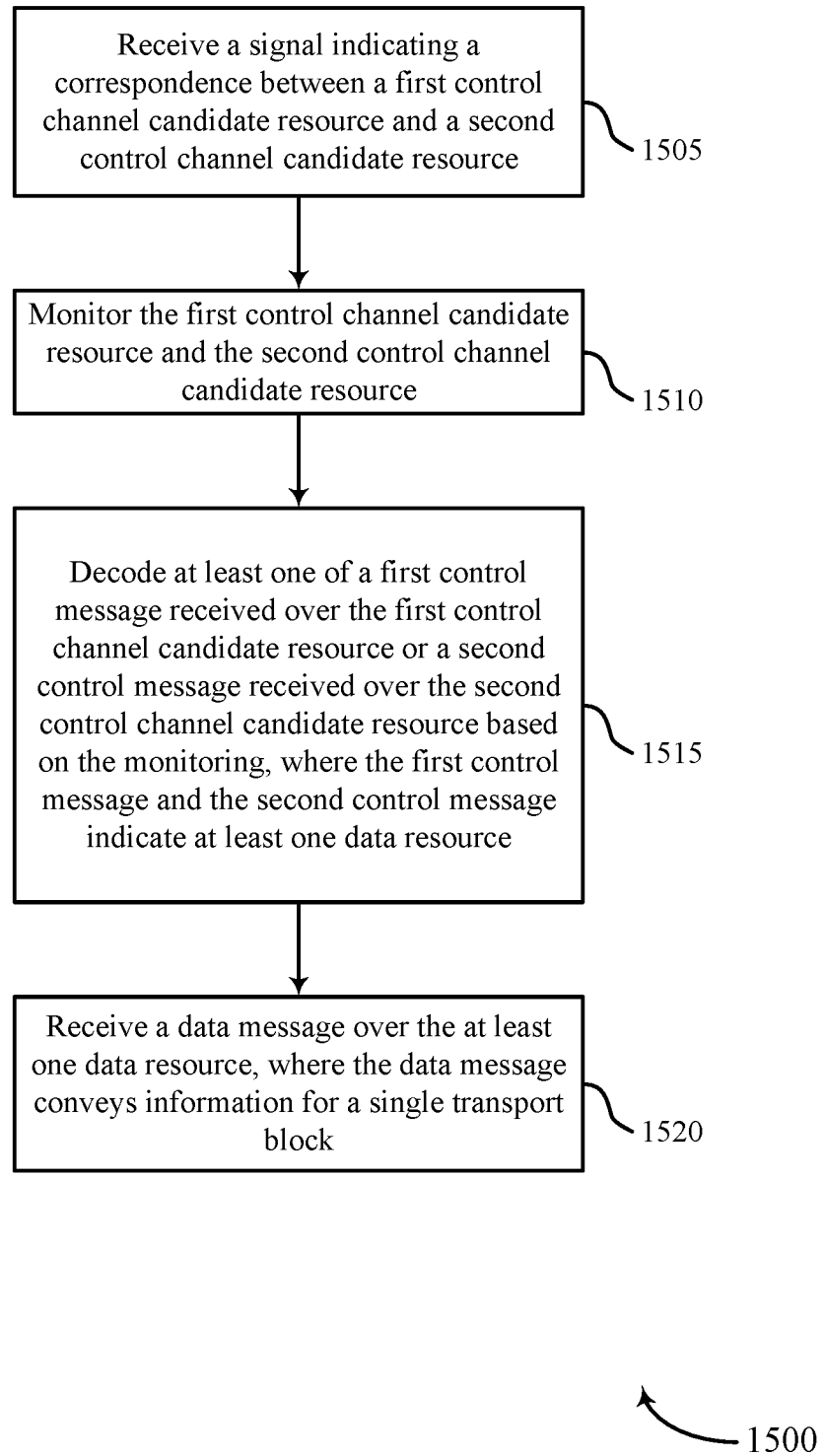
FIGS. 15 through 19 show flowcharts illustrating methods that support communication resource pairing and repetition in accordance with aspects of the present disclosure.

FIG. 15 shows a flowchart illustrating a method 1500 that supports communication resource pairing and repetition in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a signal indicating a correspondence between a first control channel candidate resource and a second control channel candidate resource. The operations of 1505 may be performed according to the methods described herein. In some examples, aspects of the operations of 1505 may be performed by a resource pairing manager as described with reference to FIGS. 7 through 10.

At 1510, the UE may monitor the first control channel candidate resource and the second control channel candidate resource. The operations of 1510 may be performed according to the methods described herein. In some examples, aspects of the operations of 1510 may be performed by a resource monitor as described with reference to FIGS. 7 through 10.

At 1515, the UE may decode at least one of a first control message received over the first control channel candidate resource or a second control message received over the second control channel candidate resource based on the monitoring, where the first control message and the second control message indicate at least one data resource. The operations of 1515 may be performed according to the methods described herein. In some examples, aspects of the operations of 1515 may be performed by a decoder as described with reference to FIGS. 7 through 10.

At 1520, the UE may receive a data message over the at least one data resource, where the data message conveys information for a single transport block. The operations of 1520 may be performed according to the methods described herein. In some examples, aspects of the operations of 1520 may be performed by a message receiver as described with reference to FIGS. 7 through 10.

Figure 16:
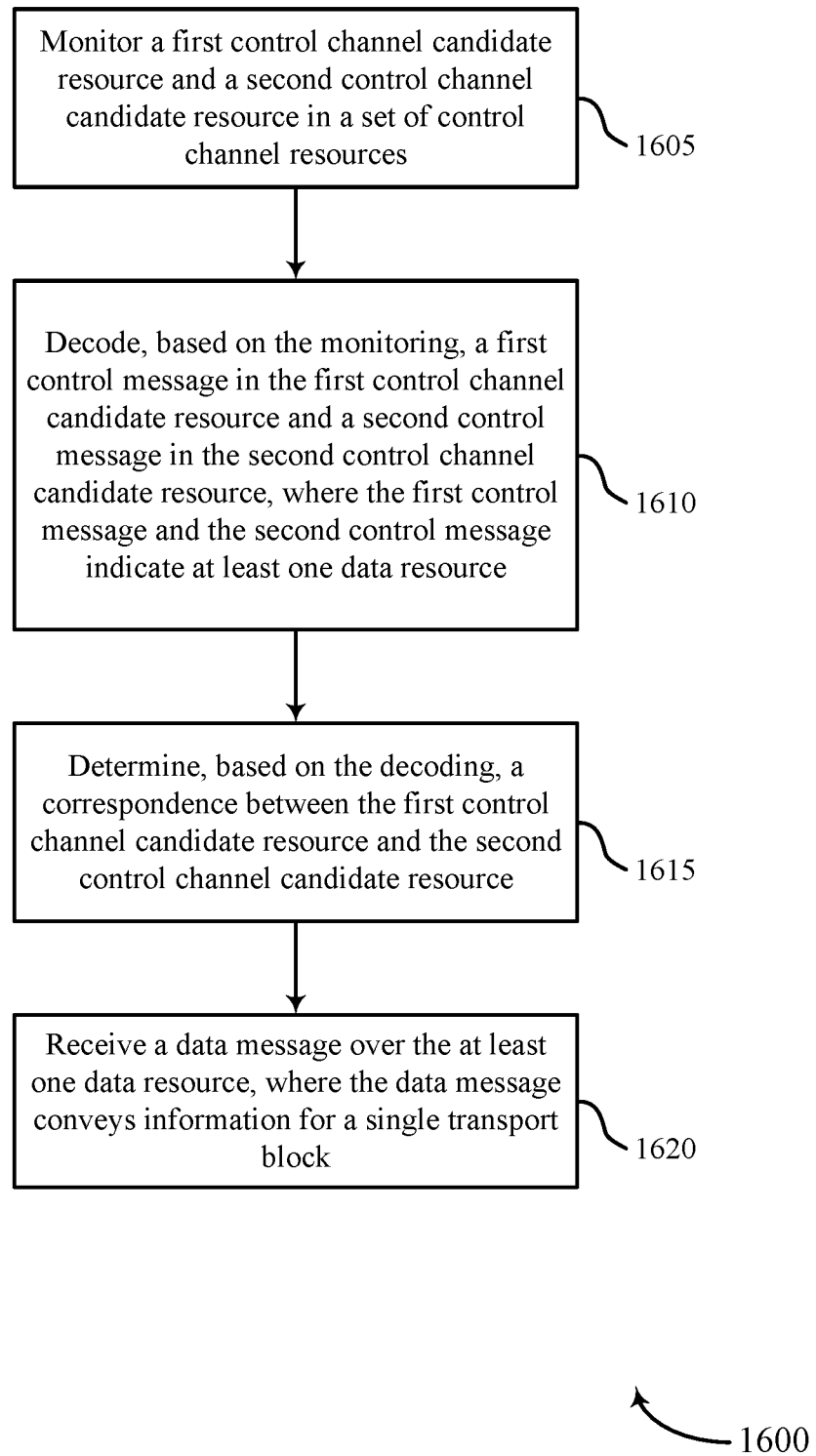

FIG. 16 shows a flowchart illustrating a method 1600 that supports communication resource pairing and repetition in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may monitor a first control channel candidate resource and a second control channel candidate resource in a set of control channel resources. The operations of 1605 may be performed according to the methods described herein. In some examples, aspects of the operations of 1605 may be performed by a resource monitor as described with reference to FIGS. 7 through 10.

At 1610, the UE may decode, based on the monitoring, a first control message in the first control channel candidate resource and a second control message in the second control channel candidate resource, where the first control message and the second control message indicate at least one data resource. The operations of 1610 may be performed according to the methods described herein. In some examples, aspects of the operations of 1610 may be performed by a decoder as described with reference to FIGS. 7 through 10.

At 1615, the UE may determine, based on the decoding, a correspondence between the first control channel candidate resource and the second control channel candidate resource. The operations of 1615 may be performed according to the methods described herein. In some examples, aspects of the operations of 1615 may be performed by a resource pairing manager as described with reference to FIGS. 7 through 10.

At 1620, the UE may receive a data message over the at least one data resource, where the data message conveys information for a single transport block. The operations of 1620 may be performed according to the methods described herein. In some examples, aspects of the operations of 1620 may be performed by a message receiver as described with reference to FIGS. 7 through 10.

Figure 17:
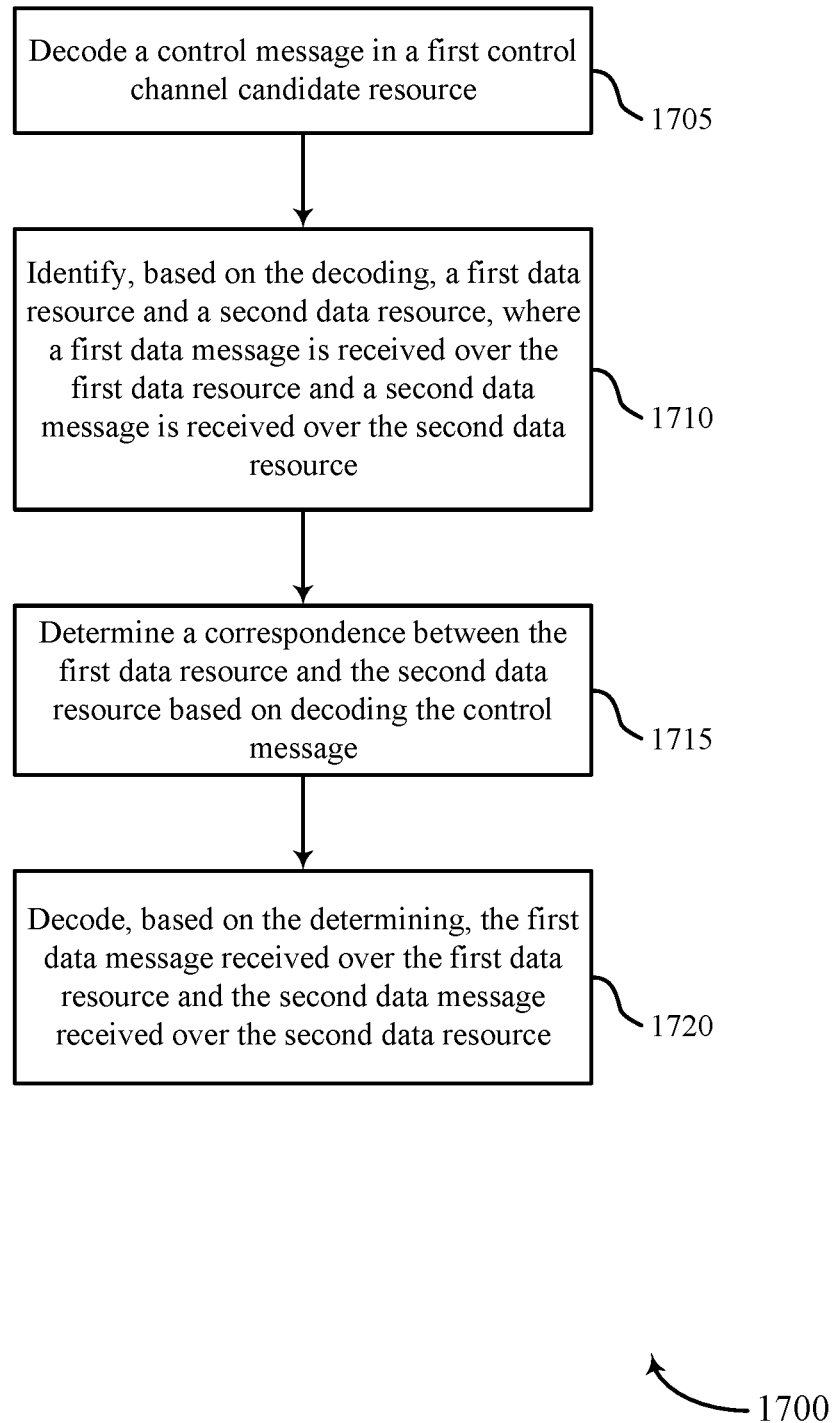

FIG. 17 shows a flowchart illustrating a method 1700 that supports communication resource pairing and repetition in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may decode a control message in a first control channel candidate resource. The operations of 1705 may be performed according to the methods described herein. In some examples, aspects of the operations of 1705 may be performed by a message receiver as described with reference to FIGS. 7 through 10.

At 1710, the UE may identify, based on the decoding, a first data resource and a second data resource, where a first data message is received over the first data resource and a second data message is received over the second data resource. The operations of 1710 may be performed according to the methods described herein. In some examples, aspects of the operations of 1710 may be performed by a resource monitor as described with reference to FIGS. 7 through 10.

At 1715, the UE may determine a correspondence between the first data resource and the second data resource based on decoding the control message. The operations of 1715 may be performed according to the methods described herein. In some examples, aspects of the operations of 1715 may be performed by a resource pairing manager as described with reference to FIGS. 7 through 10.

At 1720, the UE may decode, based on the determining, the first data message received over the first data resource and the second data message received over the second data resource. The operations of 1720 may be performed according to the methods described herein. In some examples, aspects of the operations of 1720 may be performed by a decoder as described with reference to FIGS. 7 through 10.

Figure 18:
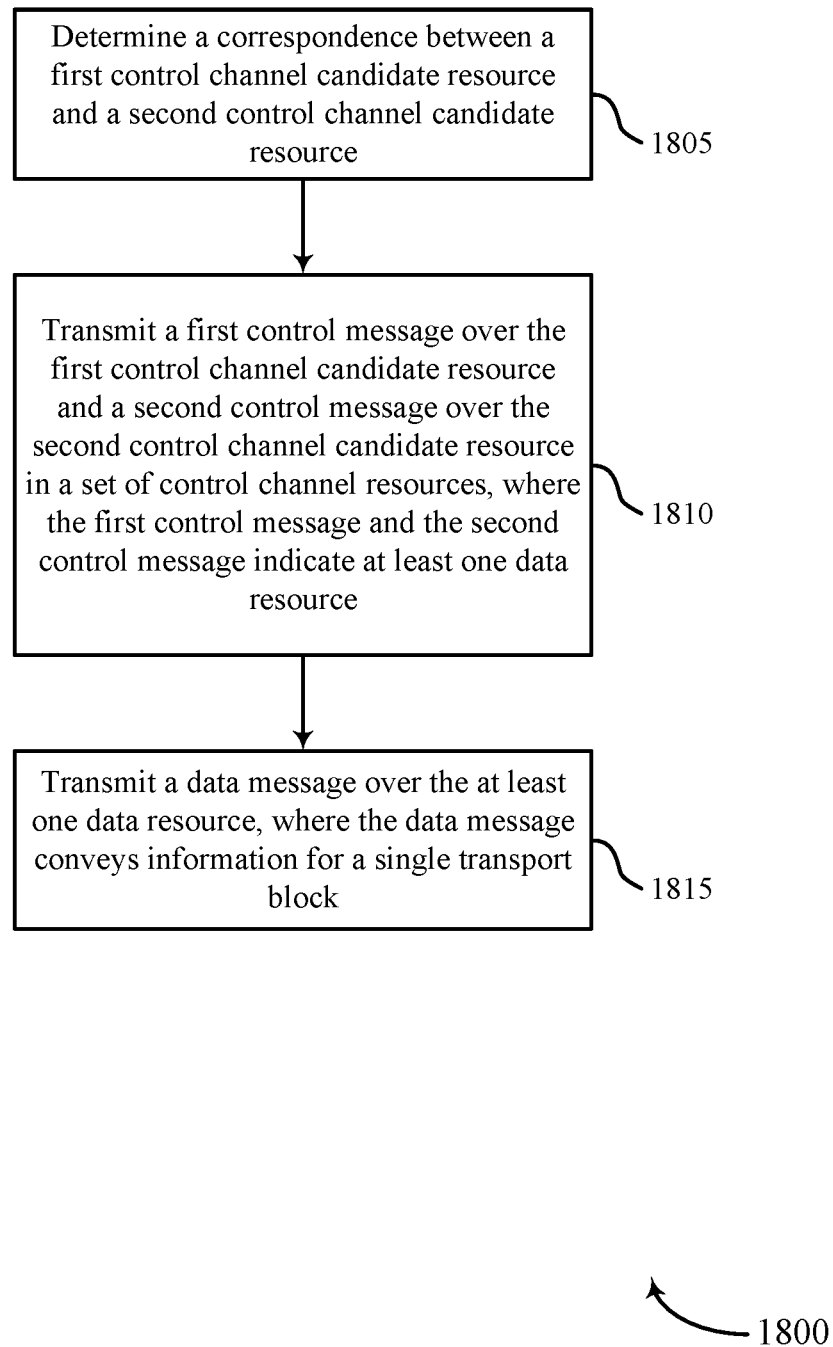

FIG. 18 shows a flowchart illustrating a method 1800 that supports communication resource pairing and repetition in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may determine a correspondence between a first control channel candidate resource and a second control channel candidate resource. The operations of 1805 may be performed according to the methods described herein. In some examples, aspects of the operations of 1805 may be performed by a resource pairing manager as described with reference to FIGS. 11 through 14.

At 1810, the base station may transmit a first control message over the first control channel candidate resource and a second control message over the second control channel candidate resource in a set of control channel resources, where the first control message and the second control message indicate at least one data resource. The operations of 1810 may be performed according to the methods described herein. In some examples, aspects of the operations of 1810 may be performed by a message transmitter as described with reference to FIGS. 11 through 14.

At 1815, the base station may transmit a data message over the at least one data resource, where the data message conveys information for a single transport block. The operations of 1815 may be performed according to the methods described herein. In some examples, aspects of the operations of 1815 may be performed by a message transmitter as described with reference to FIGS. 11 through 14.

Figure 19:
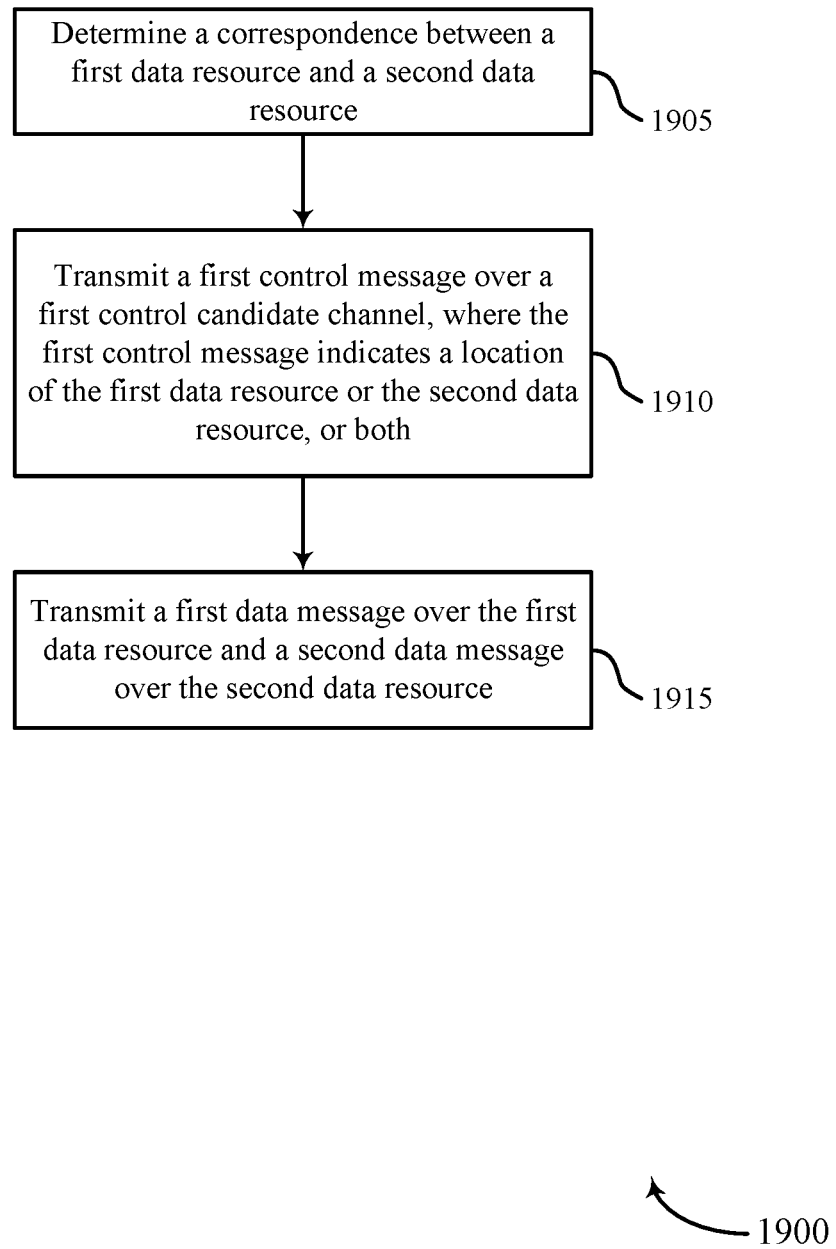

FIG. 19 shows a flowchart illustrating a method 1900 that supports communication resource pairing and repetition in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may determine a correspondence between a first data resource and a second data resource. The operations of 1905 may be performed according to the methods described herein. In some examples, aspects of the operations of 1905 may be performed by a resource pairing manager as described with reference to FIGS. 11 through 14.

At 1910, the base station may transmit a first control message over a first control candidate channel resource, where the first control message indicates a location of the first data resource or the second data resource, or both. The operations of 1910 may be performed according to the methods described herein. In some examples, aspects of the operations of 1910 may be performed by a message transmitter as described with reference to FIGS. 11 through 14.

At 1915, the base station may transmit a first data message over the first data resource and a second data message over the second data resource. The operations of 1915 may be performed according to the methods described herein. In some examples, aspects of the operations of 1915 may be performed by a message transmitter as described with reference to FIGS. 11 through 14.

Embodiment 1

A method for wireless communication at a wireless device, comprising: receiving a signal indicating a correspondence between a first control channel candidate resource and a second control channel candidate resource; monitoring the first control channel candidate resource and the second control channel candidate resource; decoding at least one of a first control message received over the first control channel candidate resource or a second control message received over the second control channel candidate resource based at least in part on the monitoring, wherein the first control message and the second control message indicate at least one data resource; and receiving a data message over the at least one data resource, wherein the data message conveys information for a single transport block.

Embodiment 2

The method of embodiment 1, wherein the monitoring comprises monitoring the first control channel candidate resource in a first set of control channel resources and the second control channel candidate resource in a second set of control channel resources, the method further comprising: receiving the first control message over the first control channel candidate resource in the first set of control channel resources and the second control message over the second control channel candidate resource in the second set of control channel resources.

Embodiment 3

The method of embodiments 1 or 2, wherein receiving the signal indicating the correspondence comprises receiving a second signal indicating a correspondence between the first set of control channel resources and the second set of control channel resources, the method further comprising: determining the correspondence between the first control channel candidate resource and the second control channel candidate resource based at least in part on the second signal.

Embodiment 4

The method of embodiments 1 to 3, wherein the first control channel candidate resource is associated with a first index of the first set of control channel resources and the second control channel candidate resource is associated with a second index of the second set of control channel resources, wherein a value of the first index and a value of the second index being the same, and wherein the signal indicates the value of the first index and the second index.

Embodiment 5

The method of embodiments 1 to 4, wherein the first set of control channel resources is associated with a first time and a first frequency bandwidth and the second set of control channel resources is associated with a second time and a second frequency bandwidth.

Embodiment 6

The method of embodiments 1 to 5, where the monitoring comprises monitoring the first control channel candidate resource and the second control channel candidate resource in a set of control channel resources, the method further comprising: receiving the first control message and the second control message over the set of control channel resources.

Embodiment 7

The method of embodiments 1 to 6, wherein the first control message and the second control message indicate a first data resource.

Embodiment 8

The method of embodiments 1 to 7, further comprising: receiving the data message over a first data resource, wherein a first starting symbol of the first control message or a second starting symbol of the second control message, or both, occur after a third starting symbol of the data message.

Embodiment 9

The method of embodiments 1 to 8, further comprising: identifying an earliest starting symbol of a HARQ feedback resource based at least in part on a HARQ processing period and a latest of a first ending symbol of the first control message, a second ending symbol of the second control message, or a third ending symbol of the data message.

Embodiment 10

The method of embodiments 1 to 9, further comprising: identifying a HARQ feedback resource based at least in part on a HARQ reporting offset and latest of a first ending symbol of the first control message, a second ending symbol of the second control message, or a third ending symbol of the data message.

Embodiment 11

The method of embodiments 1 to 10, wherein the first control message comprises first control information and the second control message comprises second control information, the first control information and the second control information being the same, wherein the decoding further comprises: soft-combining the first control message and the second control message Embodiment 12

The method of embodiments 1 to 11, wherein the first control message comprises first control information and the second control message comprises second control information, the first control information and the second control information being different.

Embodiment 13

The method of embodiments 1 to 12, further comprising: receiving the first control message over a first frequency bandwidth and the second control message over a second frequency bandwidth, wherein the first control message and the second control message indicate a location of a first data resource in the second frequency bandwidth.

Embodiment 14

The method of embodiments 1 to 13, wherein a carrier indicator field of the first control message is different than a carrier indicator field of the second control message.

Embodiment 15

The method of embodiments 1 to 14, further comprising: receiving the first control message during a first time interval and the second control message during a second time interval, the second time interval occurring no earlier than the first time interval, wherein the first control message and the second control message indicate a location of a first data resource in a third time interval; and receiving the data message during the third time interval.

Embodiment 16

The method of embodiments 1 to 15, further comprising: identifying a fourth time interval based at least in part on receiving the second control message during the second time interval and receiving the data message during the third time interval, wherein the fourth time interval occurs no earlier than the second time interval and the third time interval and comprises an offset from a later of the second time interval and the third time interval; and reporting HARQ feedback during the fourth time interval.

Embodiment 17

The method of embodiments 1 to 16, wherein the offset is based at least in part on a time location of the third time interval and a processing time for the HARQ feedback.

Embodiment 18

The method of embodiments 1 to 17, wherein the third time interval occurs after the first time interval and the second time interval.

Embodiment 19

The method of embodiments 1 to 18, wherein the third time interval is equivalent to the first time interval, and both the first time interval and the third time interval are before the second time interval.

Embodiment 20

The method of embodiments 1 to 19, further comprising: identifying a fourth time interval based at least in part on receiving the second control message during the second time interval after receiving the data message during the third time interval, wherein the fourth time interval occurs no earlier than and is offset from the second time interval; and reporting HARQ feedback during the fourth time interval.

Embodiment 21

The method of embodiments 1 to 20, wherein the third time interval is equivalent to the second time interval.

Embodiment 22

The method of embodiments 1 to 21, wherein the third time interval occurs after the first time interval and before the second time interval.

Embodiment 23

The method of embodiments 1 to 22, wherein a delay indicator field of the second control message indicates that the first data resource occurs before the second time interval.

Embodiment 24

The method of embodiments 1 to 23, wherein a delay indicator field of the first control message is different than a delay indicator field of the second control message.

Embodiment 25

The method of embodiments 1 to 24, wherein the first control message comprises first control information and the second control message comprises second control information, the method further comprising: decoding the data message based at least in part on the first control information or the second control information, or both.

Embodiment 26

The method of embodiments 1 to 25, further comprising: comparing the first control information and the second control information; determining that a parameter of the first control information is different than the parameter of the second control information, the parameter being associated with the data message; and refraining from decoding the data message based at least in part on the determining

Embodiment 27

The method of embodiments 1 to 26, wherein the parameter comprises any one of a resource allocation, a modulation and coding scheme, a rank, a demodulation reference signal port, or a redundancy version.

Embodiment 28

The method of embodiments 1 to 27, wherein the first control message indicates a first data resource and the second control message indicates a second data resource.

Embodiment 29

The method of embodiments 1 to 28, wherein receiving the data message comprises receiving a first data message over the first data resource and a second data message over the second data resource, the first data message and the second data message conveying information for the single transport block, the method further comprising: decoding the first data message, the second data message, or both based at least in part on receiving the signal.

Embodiment 30

The method of embodiments 1 to 29, wherein the decoding comprises soft-combining the first data message and the second data message.

Embodiment 31

The method of embodiments 1 to 30, further comprising: maintaining a joint HARQ buffer for the first data message and the second data message based at least in part on the soft-combining

Embodiment 32

The method of embodiments 1 to 31, further comprising: maintaining a first HARQ buffer for the first data message and a second HARQ buffer for the second data message.

Embodiment 33

The method of embodiments 1 to 32, wherein the first control channel candidate resource and the first data resource are associated with a first HARQ transmission of a first HARQ process and the second control channel candidate resource and the second data resource are associated with a retransmission of the first HARQ transmission, wherein the decoding comprises: decoding the second control message received over the second control channel candidate resource, wherein the second control message indicates the first data resource and the second data resource based at least in part on the first HARQ process and in part on the correspondence.

Embodiment 34

The method of embodiments 1 to 33, wherein receiving the data message comprises receiving the second data message, the method further comprising: buffering a second signal received during the first data resource before receiving the second data message, the second signal corresponding to the first data message; identifying the first data message based at least in part on the second data message and the first HARQ process; and soft-combining the first data message and the second data message.

Embodiment 35

The method of embodiments 1 to 34, further comprising: determining a correspondence between the first control message and the second control message based at least in part on the receiving.

Embodiment 36

The method of embodiments 1 to 35, wherein the decoding comprises: decoding the first control message; and refraining from decoding the second control message based at least in part on successfully decoding the first control message and the determining.

Embodiment 37

A method for wireless communication at a wireless device, comprising: monitoring a first control channel candidate resource and a second control channel candidate resource; decoding, based at least in part on the monitoring, a first control message in the first control channel candidate resource and a second control message in the second control channel candidate resource, wherein the first control message and the second control message indicate at least one data resource; determining, based at least in part on the decoding, a correspondence between the first control channel candidate resource and the second control channel candidate resource; and receiving a data message over the at least one data resource, wherein the data message conveys information for a single transport block.

Embodiment 38

The method of embodiment 37, wherein the first control message and the second control message indicate a first data resource.

Embodiment 39

The method of embodiments 37 or 38, wherein the first control message comprises first control information and the second control message comprises second control information, the method further comprising: identifying that the first control information and the second control information are the same, wherein determining the correspondence is based at least in part on the identifying.

Embodiment 40

The method of embodiments 37 to 39, wherein the monitoring comprises: monitoring the first control channel candidate resource and the second control channel candidate resource in a first set of control channel resources of a set of control channel resources; or monitoring the first control channel candidate resource in the first set of control channel resources of the set of control channel resources and the second control channel candidate resource in a second set of control channel resources of the set of control channel resources.

Embodiment 41

The method of embodiments 37 to 40, wherein the first control message indicates a first data resource and the second control message indicates a second data resource.

Embodiment 42

The method of embodiments 37 to 41, wherein: the first control message is associated with a first HARQ process identifier and the second control message is associated with the first HARQ process identifier; the first control message and the second control message are decoded before HARQ feedback associated with the first HARQ process identifier is transmitted; and the correspondence is determined based at least in part on decoding the first control message and the second control message before the HARQ feedback.

Embodiment 43

The method of embodiments 37 to 42, wherein the receiving comprises receiving a first data message over the first data resource and a second data message over the second data resource, the method further comprising: determining that the first data message and the second data message convey the information for the single transport block based at least in part on determining the correspondence.

Embodiment 44

A method for wireless communication at a wireless device, comprising: decoding a control message in a first control channel candidate resource; identifying, based at least in part on the decoding, a first data resource and a second data resource, wherein a first data message is received over the first data resource and a second data message is received over the second data resource; determining a correspondence between the first data resource and the second data resource based at least in part on decoding the control message; and decoding, based at least in part on the determining, the first data message received over the first data resource and the second data message received over the second data resource.

Embodiment 45

The method of embodiment 44, wherein decoding the control message further comprises: identifying that the control message comprises a first resource allocation field corresponding to the first data resource and a second resource allocation field corresponding to the second data resource, wherein the correspondence between the first data resource and the second data resource is based at least in part on the identifying.

Embodiment 46

The method of embodiments 44 or 45, further comprising: identifying a location of the first data resource based at least in part on the first resource allocation field and a location of the second data resource based at least in part on the second resource allocation field.

Embodiment 47

The method of embodiments 44 to 46, wherein the control message comprises a first resource allocation field corresponding to the first data resource, the method further comprising: receiving a signal indicating the correspondence between the first data resource and the second data resource; identifying a location of the first data resource based at least in part on the first resource allocation field; and identifying a location of the second data resource based at least in part on receiving the signal and the location of the first data resource.

Embodiment 48

The method of embodiments 44 to 47, further comprising: reporting HARQ feedback for the first data message and the second data message in a single uplink transmission.

Embodiment 49

The method of embodiments 44 to 48, wherein the first data message and the second data message convey information for a single transport block.

Embodiment 50

A method for wireless communication at a base station, comprising: determining a correspondence between a first control channel candidate resource and a second control channel candidate resource; transmitting a first control message over the first control channel candidate resource and a second control message over the second control channel candidate resource, wherein the first control message and the second control message indicate at least one data resource; and transmitting a data message over the at least one data resource, wherein the data message conveys information for a single transport block.

Embodiment 51

The method of embodiment 50, wherein the first control channel candidate resource and the second control channel candidate resource are in a first set of control channel resources of a set of control channel resources; or wherein the first control channel candidate resource is in the first set of control channel resources of the set of control channel resources and the second control channel candidate resource is in a second set of control channel resources of the set of control channel resources.

Embodiment 52

The method of embodiments 50 or 51, wherein the first control message and the second control message indicate a first data resource, the method further comprising: transmitting a first data message conveying information for the single transport block over the first data resource.

Embodiment 53

The method of embodiments 50 to 52, wherein the first control message indicates a first data resource and the second control message indicates a second data resource, the method further comprising: transmitting a first data message conveying information for the single transport block over the first data resource and a second data message conveying information for the single transport block over the second data resource.

Embodiment 54

The method of embodiments 50 to 53, further comprising: transmitting a signal indicating the correspondence between the first control channel candidate resource and the second control channel candidate resource.

Embodiment 55

The method of embodiments 50 to 54, wherein the first control message comprises first control information and the second control message comprises second control information, the first control information and the second control information being the same.

Embodiment 56

A method for wireless communication at a base station, comprising: determining a correspondence between a first data resource and a second data resource; transmitting a first control message over a first control candidate channel resource, wherein the first control message indicates a location of the first data resource or the second data resource, or both; and transmitting a first data message over the first data resource and a second data message over the second data resource.

Embodiment 57

The method of embodiment 56, wherein the first control message comprises a first resource allocation field indicating a location of the first data resource and a second allocation field indicating a location of the second data resource.

Embodiment 58

The method of embodiment 56 or 57, wherein the first control message comprises a first resource allocation field indicating a location of the first data resource, the method further comprising: transmitting a signal indicating the correspondence between the first data resource and the second data resource, wherein a location of the second data resource is based at least in part on the location of the first data resource and the signal.

Embodiment 59

The method of embodiment 56 to 58, wherein the first data message and the second data message convey information for a single transport block.

Embodiment 60

An apparatus comprising at least one means for performing a method of any of embodiments 1 to 36.

Embodiment 61

An apparatus for wireless communications comprising a processor; memory in electronic communication with the processor; and instructions stored in the memory and executable by the processor to cause the apparatus to perform a method of any of embodiments 1 to 36.

Embodiment 62

A non-transitory computer-readable medium storing code for wireless communications, the code comprising instructions executable by a processor to perform a method of any of embodiments 1 to 36.

Embodiment 63

An apparatus comprising at least one means for performing a method of any of embodiments 37 to 43.

Embodiment 64

An apparatus for wireless communications comprising a processor; memory in electronic communication with the processor; and instructions stored in the memory and executable by the processor to cause the apparatus to perform a method of any of embodiments 37 to 43.

Embodiment 65

A non-transitory computer-readable medium storing code for wireless communications, the code comprising instructions executable by a processor to perform a method of any of embodiments 37 to 43.

Embodiment 66

An apparatus comprising at least one means for performing a method of any of embodiments 44 to 49.

Embodiment 67

An apparatus for wireless communications comprising a processor; memory in electronic communication with the processor; and instructions stored in the memory and executable by the processor to cause the apparatus to perform a method of any of embodiments 44 to 49.

Embodiment 68

A non-transitory computer-readable medium storing code for wireless communications, the code comprising instructions executable by a processor to perform a method of any of embodiments 44 to 49.

Embodiment 69

An apparatus comprising at least one means for performing a method of any of embodiments 50 to 55.

Embodiment 70

An apparatus for wireless communications comprising a processor; memory in electronic communication with the processor; and instructions stored in the memory and executable by the processor to cause the apparatus to perform a method of any of embodiments 50 to 55.

Embodiment 71

A non-transitory computer-readable medium storing code for wireless communications, the code comprising instructions executable by a processor to perform a method of any of embodiments 50 to 55.

Embodiment 72

An apparatus comprising at least one means for performing a method of any of embodiments 56 to 59.

Embodiment 73

An apparatus for wireless communications comprising a processor; memory in electronic communication with the processor; and instructions stored in the memory and executable by the processor to cause the apparatus to perform a method of any of embodiments 56 to 59.

Embodiment 74

A non-transitory computer-readable medium storing code for wireless communications, the code comprising instructions executable by a processor to perform a method of any of embodiments 56 to 59.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The term "carrier" refers to a set of radio frequency spectrum resources having a defined physical layer structure for supporting communications over a communication link. For example, a carrier of a communication link may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using MCM techniques such as OFDM or DFT-s-OFDM).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
   receiving a signal indicating a correspondence between a first control channel candidate resource and a second control channel candidate resource, the correspondence comprising repetition of control information in a first control message received over the first control channel candidate resource and in a second control message received over the second control channel candidate resource;
   monitoring the first control channel candidate resource and the second control channel candidate resource;
   decoding at least one of the first control message received over the first control channel candidate resource or the second control message received over the second control channel candidate resource based at least in part on the monitoring, wherein the first control message and the second control message indicate at least one data resource, the at least one data resource indicated by the first control message and the second control message comprising a single transport block; and
   receiving a data message over the at least one data resource, wherein the data message conveys information for the single transport block.

2. The method of claim 1, wherein the monitoring comprises monitoring the first control channel candidate resource in a first set of control channel resources and the second control channel candidate resource in a second set of control channel resources, the method further comprising:
   receiving the first control message over the first control channel candidate resource in the first set of control channel resources and the second control message over the second control channel candidate resource in the second set of control channel resources.

3. The method of claim 2, wherein receiving the signal indicating the correspondence comprises receiving a second signal indicating a correspondence between the first set of control channel resources and the second set of control channel resources, the method further comprising:
   determining the correspondence between the first control channel candidate resource and the second control channel candidate resource based at least in part on the second signal.

4. The method of claim 2, wherein the first control channel candidate resource is associated with a first index of the first set of control channel resources and the second control channel candidate resource is associated with a second index of the second set of control channel resources, wherein a value of the first index and a value of the second index being the same, and wherein the signal indicates the value of the first index and the second index.

5. The method of claim 2, wherein the first set of control channel resources is associated with a first time and a first frequency bandwidth and the second set of control channel resources is associated with a second time and a second frequency bandwidth.

6. The method of claim 1, wherein the monitoring comprises monitoring the first control channel candidate resource and the second control channel candidate resource in a set of control channel resources, the method further comprising:
   receiving the first control message and the second control message over the set of control channel resources.

7. The method of claim 1, wherein the first control message and the second control message indicate a first data resource.

8. The method of claim 1, further comprising:
   receiving the data message over a first data resource, wherein a first starting symbol of the first control message or a second starting symbol of the second control message, or both, occur after a third starting symbol of the data message.

9. The method of claim 1, further comprising:
   identifying an earliest starting symbol of a hybrid automatic repeat request (HARQ) feedback resource based at least in part on a HARQ processing period and a latest of a first ending symbol of the first control message, a second ending symbol of the second control message, or a third ending symbol of the data message.

10. The method of claim 1, further comprising:
    identifying a hybrid automatic repeat request (HARQ) feedback resource based at least in part on a HARQ reporting offset and latest of a first ending symbol of the first control message, a second ending symbol of the second control message, or a third ending symbol of the data message.

11. The method of claim 1, wherein the first control message comprises first control information and the second control message comprises second control information, the first control information and the second control information being the same, wherein the decoding further comprises:
  soft-combining the first control message and the second control message.

12. The method of claim 1, wherein the first control message comprises first control information and the second control message comprises second control information, the first control information and the second control information being different.

13. The method of claim 1, further comprising:
  receiving the first control message over a first frequency bandwidth and the second control message over a second frequency bandwidth, wherein the first control message and the second control message indicate a location of a first data resource in the second frequency bandwidth.

14. The method of claim 1, wherein a carrier indicator field of the first control message is different than a carrier indicator field of the second control message.

15. The method of claim 1, further comprising:
  receiving the first control message during a first time interval and the second control message during a second time interval, the second time interval occurring no earlier than the first time interval, wherein the first control message and the second control message indicate a location of a first data resource in a third time interval; and
  receiving the data message during the third time interval.

16. The method of claim 15, further comprising:
  identifying a fourth time interval based at least in part on receiving the second control message during the second time interval and receiving the data message during the third time interval, wherein the fourth time interval occurs no earlier than the second time interval and the third time interval and comprises an offset from a later of the second time interval and the third time interval; and
  reporting hybrid automatic repeat request (HARQ) feedback during the fourth time interval.

17. The method of claim 16, wherein the offset is based at least in part on a time location of the third time interval and a processing time for the HARQ feedback.

18. The method of claim 15, wherein the third time interval occurs after the first time interval and the second time interval.

19. The method of claim 15, wherein the third time interval occurs before the second time interval.

20. The method of claim 15, further comprising:
  identifying a fourth time interval based at least in part on receiving the second control message during the second time interval after receiving the data message during the third time interval, wherein the fourth time interval occurs no earlier than and is offset from the second time interval; and
  reporting hybrid automatic repeat request (HARQ) feedback during the fourth time interval.

21. The method of claim 15, wherein a delay indicator field of the second control message indicates that the first data resource occurs before the second time interval.

22. The method of claim 1, wherein a delay indicator field of the first control message is different than a delay indicator field of the second control message.

23. The method of claim 1, wherein the first control message comprises first control information and the second control message comprises second control information, the method further comprising:
  decoding the data message based at least in part on the first control information or the second control information, or both.

24. The method of claim 23, further comprising:
  comparing the first control information and the second control information;
  determining that a parameter of the first control information is different than the parameter of the second control information, the parameter being associated with the data message; and
  refraining from decoding the data message based at least in part on the determining.

25. The method of claim 24, wherein the parameter comprises any one of a resource allocation, a modulation and coding scheme, a rank, a demodulation reference signal port, or a redundancy version.

26. The method of claim 1, wherein the first control message indicates a first data resource and the second control message indicates a second data resource.

27. The method of claim 26, wherein receiving the data message comprises receiving a first data message over the first data resource and a second data message over the second data resource, the first data message and the second data message conveying information for the single transport block, the method further comprising:
  decoding the first data message, the second data message, or both based at least in part on receiving the signal.

28. The method of claim 27, wherein the decoding comprises soft-combining the first data message and the second data message.

29. The method of claim 28, further comprising:
  maintaining a joint hybrid automatic repeat request (HARQ) buffer for the first data message and the second data message based at least in part on the soft-combining.

30. The method of claim 27, further comprising:
  maintaining a first hybrid automatic repeat request (HARQ) buffer for the first data message and a second HARQ buffer for the second data message.

31. The method of claim 27, wherein the first control channel candidate resource and the first data resource are associated with a first hybrid automatic repeat request (HARQ) transmission of a first HARQ process and the second control channel candidate resource and the second data resource are associated with a retransmission of the first HARQ transmission, wherein the decoding comprises:
  decoding the second control message received over the second control channel candidate resource, wherein the second control message indicates the first data resource and the second data resource based at least in part on the first HARQ process and in part on the correspondence.

32. The method of claim 31, wherein receiving the data message comprises receiving the second data message, the method further comprising:
  buffering a second signal received during the first data resource before receiving the second data message, the second signal corresponding to the first data message;
  identifying the first data message based at least in part on the second data message and the first HARQ process; and
  soft-combining the first data message and the second data message.

33. The method of claim 1, further comprising:
  determining a correspondence between the first control message and the second control message based at least in part on the receiving.

34. The method of claim 33, wherein the decoding comprises:
  decoding the first control message; and
  refraining from decoding the second control message based at least in part on successfully decoding the first control message and the determining.

35. A method for wireless communication at a wireless device, comprising:
  monitoring a first control channel candidate resource and a second control channel candidate resource;
  decoding, based at least in part on the monitoring, a first control message in the first control channel candidate resource and a second control message in the second control channel candidate resource, wherein the first control message and the second control message indicate at least one data resource, the at least one data resource indicated by the first control message and the second control message comprising a single transport block;
  determining, based at least in part on the decoding, a correspondence between the first control channel candidate resource and the second control channel candidate resource, the correspondence comprising repetition of control information in the first control message decoded in the first control channel candidate resource and in the second control message decoded in the second control channel candidate resource; and
  receiving a data message over the at least one data resource, wherein the data message conveys information for the single transport block.

36. The method of claim 35, wherein the first control message and the second control message indicate a first data resource.

37. The method of claim 35, wherein the first control message comprises first control information and the second control message comprises second control information, the method further comprising:
  identifying that the first control information and the second control information are the same, wherein determining the correspondence is based at least in part on the identifying.

38. The method of claim 35, wherein the monitoring comprises:
  monitoring the first control channel candidate resource and the second control channel candidate resource in a first set of control channel resources of a set of control channel resources; or
  monitoring the first control channel candidate resource in the first set of control channel resources of the set of control channel resources and the second control channel candidate resource in a second set of control channel resources of the set of control channel resources.

39. The method of claim 35, wherein the first control message indicates a first data resource and the second control message indicates a second data resource.

40. The method of claim 39, wherein:
  the first control message is associated with a first hybrid automatic repeat request (HARQ) process identifier and the second control message is associated with the first HARQ process identifier;
  the first control message and the second control message are decoded before HARQ feedback associated with the first HARQ process identifier is transmitted; and
  the correspondence is determined based at least in part on decoding the first control message and the second control message before the HARQ feedback.

41. The method of claim 39, wherein the receiving comprises receiving a first data message over the first data resource and a second data message over the second data resource, the method further comprising:
  determining that the first data message and the second data message convey the information for the single transport block based at least in part on determining the correspondence.

42. A method for wireless communication at a wireless device, comprising:
  decoding a control message in a first control channel candidate resource;
  identifying, based at least in part on the decoding, a first data resource and a second data resource, wherein a first data message is received over the first data resource and a second data message is received over the second data resource;
  determining a correspondence between the first data resource and the second data resource based at least in part on decoding the control message;
  identifying that the control message comprises a first resource allocation field corresponding to the first data resource and a second resource allocation field corresponding to the second data resource, wherein the correspondence between the first data resource and the second data resource is based at least in part on the identifying; and
  decoding, based at least in part on the determining, the first data message received over the first data resource and the second data message received over the second data resource.

43. The method of claim 42, further comprising:
  identifying a location of the first data resource based at least in part on the first resource allocation field and a location of the second data resource based at least in part on the second resource allocation field.

44. The method of claim 42, further comprising:
  reporting HARQ feedback for the first data message and the second data message in a single uplink transmission.

45. The method of claim 42, wherein the first data message and the second data message convey information for a single transport block.

46. A method for wireless communication at a base station, comprising:
  determining a correspondence between a first control channel candidate resource and a second control channel candidate resource, the correspondence comprising repetition of control information in a first control message to be transmitted over the first control channel candidate resource and in a second control message to be transmitted over the second control channel candidate resource;
  transmitting the first control message over the first control channel candidate resource and the second control message over the second control channel candidate resource, wherein the first control message and the second control message indicate at least one data resource, the at least one data resource indicated by the first control message and the second control message comprising a single transport block; and
  transmitting a data message over the at least one data resource, wherein the data message conveys information for the single transport block.

47. The method of claim 46, wherein the first control channel candidate resource and the second control channel candidate resource are in a first set of control channel resources of a set of control channel resources; or wherein the first control channel candidate resource is in the first set of control channel resources of the set of control channel resources and the second control channel candidate resource is in a second set of control channel resources of the set of control channel resources.

48. The method of claim 46, wherein the first control message and the second control message indicate a first data resource, the method further comprising:
transmitting a first data message conveying information for the single transport block over the first data resource.

49. The method of claim 46, wherein the first control message indicates a first data resource and the second control message indicates a second data resource, the method further comprising:
transmitting a first data message conveying information for the single transport block over the first data resource and a second data message conveying information for the single transport block over the second data resource.

50. The method of claim 46, further comprising:
transmitting a signal indicating the correspondence between the first control channel candidate resource and the second control channel candidate resource.

51. The method of claim 46, wherein the first control message comprises first control information and the second control message comprises second control information, the first control information and the second control information being the same.

52. A method for wireless communication at a base station, comprising:
establishing a correspondence between a first data resource and a second data resource;
transmitting, over a first candidate control channel resource, a first control message comprising a first resource allocation field corresponding to the first data resource and a second resource allocation field corresponding to the second data resource, wherein the correspondence between the first data resource and the second data resource is based at least in part on the transmitting and the first control message indicates a location of the first data resource or a location of the second data resource, or both; and
transmitting a first data message over the first data resource and a second data message over the second data resource, wherein the first data message and the second data message convey information for a single transport block.

53. The method of claim 52, wherein the first resource allocation field indicates the location of the first data resource and the second resource allocation field indicates the location of the second data resource.

54. The method of claim 52, wherein the first resource allocation field indicates the location of the first data resource, the method further comprising:
transmitting a signal indicating the correspondence between the first data resource and the second data resource, wherein a location of the second data resource is based at least in part on the location of the first data resource and the signal.

55. An apparatus for wireless communication at a wireless device, comprising: a processor, memory in electronic communication with the processor; and instructions stored in the memory and executable by the processor to cause the apparatus to:
receive a signal indicating a correspondence between a first control channel candidate resource and a second control channel candidate resource, the correspondence comprising repetition of control information in a first control message received over the first control channel candidate resource and in a second control message received over the second control channel candidate resource;
monitor the first control channel candidate resource and the second control channel candidate resource;
decode at least one of the first control message received over the first control channel candidate resource or the second control message received over the second control channel candidate resource based at least in part on the monitoring, wherein the first control message and the second control message indicate at least one data resource, the at least one data resource indicated by the first control message and the second control message comprising a single transport block; and
receive a data message over the at least one data resource, wherein the data message conveys information for the single transport block.

56. The apparatus of claim 55, wherein the monitoring comprises monitoring the first control channel candidate resource in a first set of control channel resources and the second control channel candidate resource in a second set of control channel resources, and the instructions are further executable by the processor to cause the apparatus to:
receive the first control message over the first control channel candidate resource in the first set of control channel resources and the second control message over the second control channel candidate resource in the second set of control channel resources.

57. The apparatus of claim 55, wherein the monitoring comprises monitoring the first control channel candidate resource and the second control channel candidate resource in a set of control channel resources, and the instructions are further executable by the processor to cause the apparatus to:
receive the first control message and the second control message over the set of control channel resources.

58. The apparatus of claim 55, wherein the first control message and the second control message indicate a first data resource.

59. The apparatus of claim 55, wherein the first control message comprises first control information and the second control message comprises second control information, and the instructions are further executable by the processor to cause the apparatus to:
decode the data message based at least in part on the first control information or the second control information, or both.

60. The apparatus of claim 55, wherein the instructions are further executable by the processor to cause the apparatus to:
determine a correspondence between the first control message and the second control message based at least in part on the receiving.

61. An apparatus for wireless communication at a wireless device, comprising:
means for receiving a signal indicating a correspondence between a first control channel candidate resource and a second control channel candidate resource, the correspondence comprising repetition of control information in a first control message received over the first control channel candidate resource and in a second control message received over the second control channel candidate resource;

means for monitoring the first control channel candidate resource and the second control channel candidate resource;

means for decoding at least one of the first control message received over the first control channel candidate resource or the second control message received over the second control channel candidate resource based at least in part on the monitoring, wherein the first control message and the second control message indicate at least one data resource, the at least one data resource indicated by the first control message and the second control message comprising a single transport block; and means for receiving a data message over the at least one data resource, wherein the data message conveys information for the single transport block.

62. A non-transitory computer-readable medium storing code for wireless communication at a wireless device, the code comprising instructions executable by a processor to:

receive a signal indicating a correspondence between a first control channel candidate resource and a second control channel candidate resource, the correspondence comprising repetition of control information in a first control message received over the first control channel candidate resource and in a second control message received over the second control channel candidate resource;

monitor the first control channel candidate resource and the second control channel candidate resource;

decode at least one of the first control message received over the first control channel candidate resource or the second control message received over the second control channel candidate resource based at least in part on the monitoring, wherein the first control message and the second control message indicate at least one data resource, the at least one data resource indicated by the first control message and the second control message comprising a single transport block; and receive a data message over the at least one data resource, wherein the data message conveys information for the single transport block.

* * * * *